(12) United States Patent
Noh et al.

(10) Patent No.: US 10,736,091 B2
(45) Date of Patent: Aug. 4, 2020

(54) METHOD AND APPARATUS FOR ADAPTING BANDWIDTH OF TERMINAL IN WIRELESS COMMUNICATION SYSTEM

(71) Applicant: Samsung Electronics Co., Ltd., Suwon-si, Gyeonggi-do (KR)

(72) Inventors: Hoon-dong Noh, Suwon-si (KR); Young-woo Kwak, Suwon-si (KR); Ju-ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/998,495

(22) Filed: Aug. 16, 2018

(65) Prior Publication Data

US 2019/0059078 A1    Feb. 21, 2019

(30) Foreign Application Priority Data

Aug. 16, 2017    (KR) .......................... 10-2017-0103726

(51) Int. Cl.
| | | |
|---|---|---|
| *H04W 72/04* | (2009.01) | |
| *H04L 5/00* | (2006.01) | |
| *H04B 1/00* | (2006.01) | |
| *H04W 28/20* | (2009.01) | |

(52) U.S. Cl.
CPC .......... *H04W 72/042* (2013.01); *H04B 1/005* (2013.01); *H04L 5/0048* (2013.01); *H04L 5/0064* (2013.01); *H04L 5/0082* (2013.01); *H04L 5/0092* (2013.01);

(Continued)

(58) Field of Classification Search
CPC .......................... H04W 72/042; H04W 72/048
See application file for complete search history.

(56) References Cited

U.S. PATENT DOCUMENTS 6,041,233 A * 3/2000 Rosati ................ H04B 7/18578
370/316
6,735,176 B1 * 5/2004 So ...................... H04Q 11/0062
370/231

(Continued)

FOREIGN PATENT DOCUMENTS

| EP | 2 312 895 A1 | 4/2011 |
| KR | 10-2018-0057463 A | 5/2018 |
| WO | 2010/051209 A1 | 5/2010 |

OTHER PUBLICATIONS

Mediatek Inc.; Efficient Wider Bandwidth Operations for NR; 3GPP TSG RAN WG1 Meeting #88bis; R1-1704445; Apr. 13-17, 2017; Spokane, USA.

(Continued)

*Primary Examiner* — Rasheed Gidado
(74) *Attorney, Agent, or Firm* — Jefferson IP Law, LLP

(57) ABSTRACT

Methods and apparatuses for adapting a bandwidth of a terminal in a wireless communication system are provided. The method includes transmitting, to a base station (BS), information about bandwidth adaptation capability of the terminal, receiving, from the BS, a bandwidth adaptation command for requesting adaptation to a bandwidth corresponding to the bandwidth adaptation capability of the terminal, and adapting the bandwidth of the terminal in at least one symbol location in a unit time period of a subframe, based on the received bandwidth adaptation command.

19 Claims, 18 Drawing Sheets

(52) U.S. Cl.
CPC .......... *H04W 28/20* (2013.01); *H04L 5/0023* (2013.01); *H04L 5/0035* (2013.01); *H04W 72/048* (2013.01)

(56) References Cited

U.S. PATENT DOCUMENTS

| | | | |
|---|---|---|---|
| 2004/0062273 A1* | 4/2004 | Frank | G01S 5/0252 370/468 |
| 2010/0203911 A1* | 8/2010 | Cordeiro | H04W 72/0453 455/501 |
| 2012/0163321 A1* | 6/2012 | Lee | H04W 72/0413 370/329 |
| 2012/0184316 A1* | 7/2012 | Ode | H04W 28/20 455/509 |
| 2015/0249941 A1 | 9/2015 | Wang et al. | |
| 2016/0127997 A1 | 5/2016 | Ang et al. | |
| 2018/0146439 A1* | 5/2018 | Kim | H04W 52/283 |
| 2018/0332505 A1* | 11/2018 | Kim | H04L 5/0064 |

OTHER PUBLICATIONS

Ericsson; On bandwidth parts; 3GPP TSG-RAN WG1 #90; R1-1712953; Aug. 21-25, 2017; Prague, Czech Republic.
NTT DOCOMO, Inc.; Remaining issues on bandwidth parts for NR; 3GPP TSG RAN WG1 Meeting #90; R1-1713964; Aug. 21-25, 2017; Prague, Czech Republic.
Samsung; Power saving for wideband carrier in NR; 3GPP TSG-RAN WG2 NR #99 Meeting; R2-1708087; Aug. 21-25, 2017; Berlin, Germany.
International Search Report dated Nov. 20, 2018; International Appln. No. PCT/KR2018/009383.
Extended European Search Report dated May 14, 2020, issued in European Application No. 18846723.7-1220.

* cited by examiner

METHOD AND APPARATUS FOR ADAPTING BANDWIDTH OF TERMINAL IN WIRELESS COMMUNICATION SYSTEM

CROSS-REFERENCE TO RELATED APPLICATIONS

This application is based on and claims priority under 35 U.S.C. § 119 (a) of a Korean patent application number 10-2017-0103726, filed on Aug. 16, 2017, in the Korean Intellectual Property Office, the disclosure of which is incorporated by reference herein in its entirety.

BACKGROUND

1. Field

The disclosure relates to wireless communication systems. More particularly, the disclosure relates to methods and apparatuses for adapting a bandwidth of a terminal in a wireless communication system.

2. Description of Related Art

To satisfy increasing demands for wireless data traffic after commercialization of 4th generation communication (4G) systems, efforts are being made to develop 5th generation communication (5G) (or new radio (NR)) systems or pre-5G systems advanced from the 4G systems. As such, the 5G systems or the pre-5G systems are called 'beyond 4G network' systems or 'post-long term evolution (post-LTE)' systems.

To achieve higher data rates, implementation of the 5G systems in a millimeter wave (mm Wave) band (e.g., a 60 GHz band) is considered. To reduce path loss and increase propagation distances of radio waves in the mm Wave band, beamforming, massive multiple-input and multiple-output (massive MIMO), full-dimension MIMO (FD-MIMO), array antenna, analog beamforming, and large scale antenna technologies for the 5G systems are under discussion.

To enhance system networks, for example, evolved small cell, advanced small cell, cloud radio access network (cloud RAN), ultra-dense network, device-to-device (D2D) communication, wireless backhaul, moving network, cooperative communication, coordinated multi-points (CoMP), and interference cancellation technologies for the 5G systems are being developed.

In addition, advanced coding modulation (ACM) technologies such as hybrid frequency-shift keying (FSK) and quadrature amplitude modulation (QAM) (FQAM) and sliding-window superposition coding (SWSC), and advanced access technologies such as filter bank multicarrier (FBMC), non-orthogonal multiple access (NOMA), and sparse code multiple access (SCMA) for the 5G systems are being developed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for adapting a bandwidth of a terminal to allow transmission and reception of signals between a base station (BS) and the terminal through a bandwidth including at least some of overall bands of a wireless communication system.

Additional aspects will be set forth in part in the description which follows and, in part, will be apparent from the description, or may be learned by practice of the presented embodiments.

In accordance with an aspect of the disclosure, a method, performed by a terminal, of adapting a bandwidth for transmitting and receiving signals is provided. The method includes transmitting, to a base station (BS), information about bandwidth adaptation capability of the terminal, receiving, from the BS, a bandwidth adaptation command for requesting adaptation to a bandwidth corresponding to the bandwidth adaptation capability of the terminal, and adapting the bandwidth of the terminal in at least one symbol location in a unit time period of a subframe based on the received bandwidth adaptation command.

In accordance with another aspect of the disclosure, a method, performed by a BS, of adapting a bandwidth for transmitting and receiving signals to and from a terminal is provided. The method includes receiving information about bandwidth adaptation capability of the terminal, determining a bandwidth corresponding to the bandwidth adaptation capability of the terminal based on the information about the bandwidth adaptation capability of the terminal, and transmitting, to the terminal, a bandwidth adaptation command for requesting adaptation to the bandwidth determined by the BS.

In accordance with another aspect of the disclosure, a terminal for adapting a bandwidth for transmitting and receiving signals is provided. The terminal includes a transceiver configured to transmit, to a base station (BS), information about bandwidth adaptation capability of the terminal, and receive, from the BS, a bandwidth adaptation command for requesting adaptation to a bandwidth corresponding to the bandwidth adaptation capability of the terminal, a memory configured to store the information about the bandwidth adaptation capability of the terminal, and a processor configured to adapt the bandwidth of the terminal in at least one symbol location in a unit time period of a subframe based on the received bandwidth adaptation command.

In accordance with another aspect of the disclosure, a base station (BS) for adapting a bandwidth for transmitting and receiving signals to and from a terminal is provided. The BS includes a transceiver configured to receive information about bandwidth adaptation capability of the terminal, a memory configured to store the information about the bandwidth adaptation capability of the terminal, and a processor configured to determine a bandwidth corresponding to the bandwidth adaptation capability of the terminal based on the information about the bandwidth adaptation capability of the terminal, wherein the transceiver is further configured to transmit, to the terminal, a bandwidth adaptation command for requesting adaptation to the bandwidth determined by the BS.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
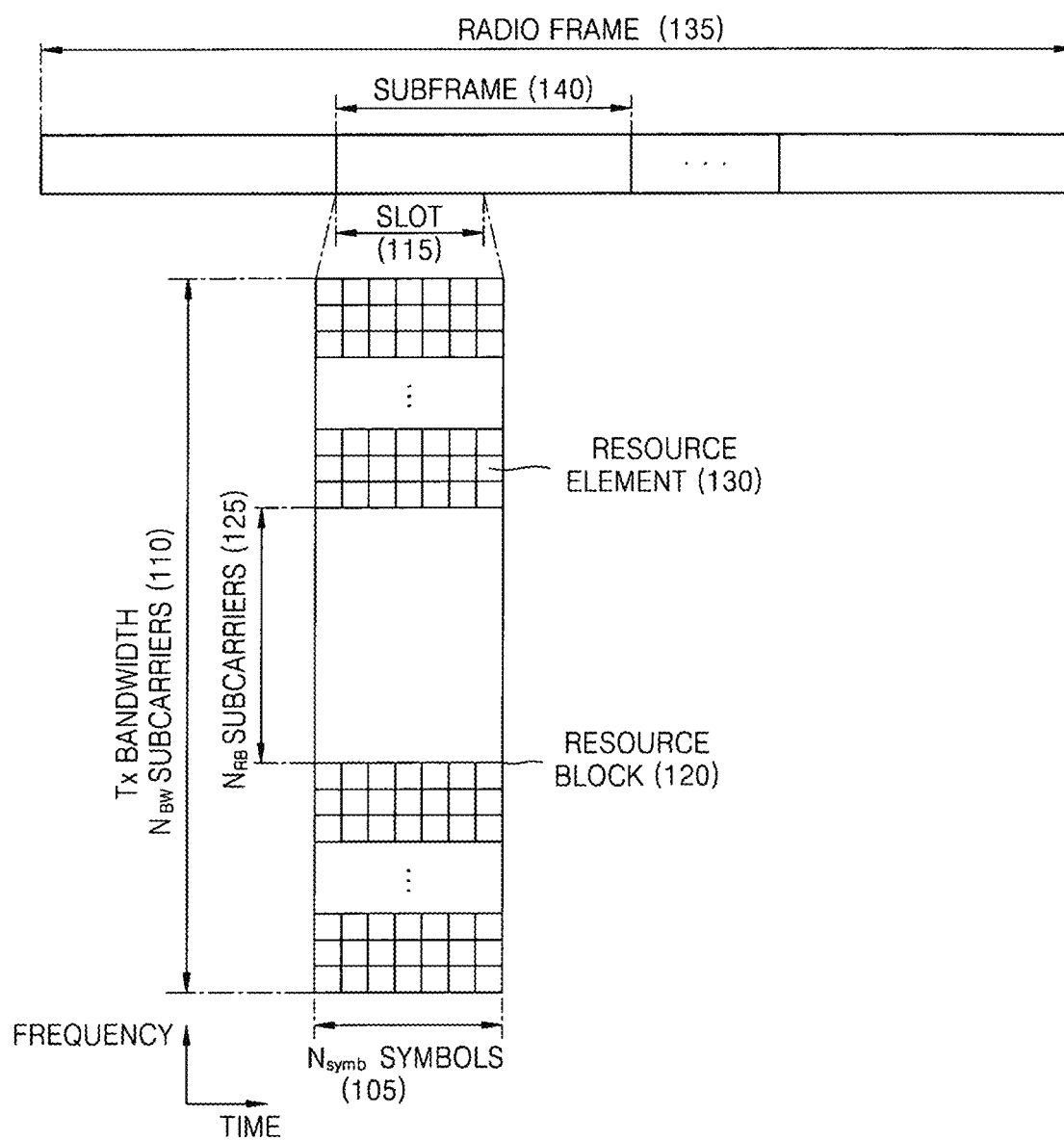
FIG. 1 is a diagram showing a basic structure of a time-frequency resource region corresponding to a wireless resource region of a wireless communication system based on cyclic prefix (CP)-orthogonal frequency division multiplexing (OFDM) or single carrier (SC)-frequency division multiple access (FDMA), according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and configurations may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used herein are selected in consideration of functions obtained in accordance with the embodiments, and may be replaced by other terms based on intentions of one of ordinary skill in the art, customs, emergence of new technologies, or the like. Therefore, it is noted that the terms are construed based on the whole content of this specification. As used herein, the term "and/or" includes any and all combinations of one or more of the associated listed items. Expressions such as "at least one of," when preceding a list of elements, modify the entire list of elements and do not modify the individual elements of the list.

A technology of receiving broadcast information from a base station (BS) by a terminal in a wireless communication system will now be described. The disclosure relates to communication techniques for integrating the internet of things (IoT) technology with a 5th generation communication (5G) system advanced from a 4th generation communication (4G) system to achieve a higher data rate, and systems using the same. The disclosure is applicable to intelligent services (e.g., smart home, smart building, smart city, smart car or connected car, healthcare, digital education, retail trade, security, and safety services) based on 5G communication technologies and IoT-related technologies.

As used herein, terms designating broadcast information, terms designating control information, terms designating coverage, terms designating status variations (e.g., event), terms designating network entities, terms designating messages, terms designating components of an apparatus, etc. are provided as examples for convenience of explanation. Therefore, the disclosure is not limited by the terms described below, and other terms having technically equivalent meanings may also be used.

In the following description, for convenience of explanation, some of terms and names defined by the 3rd generation partnership project (3GPP) long term evolution (LTE) standards may be used. However, the disclosure is not limited by these terms and names, and is equally applicable to systems according to other standards.

Wireless communication systems providing voice-based services are being developed to broadband wireless communication systems providing high-speed and high-quality packet data services according to communication standards such as high speed packet access (HSPA), LTE or evolved universal terrestrial radio access (E-UTRA), LTE-advanced (LTE-A), LTE-Pro of 3GPP, high rate packet data (HRPD) and ultra mobile broadband (UMB) of 3GPP2, and 802.16e of the institute of electrical and electronics engineers (IEEE).

As a representative example of the broadband wireless communication systems, an LTE system employs orthogonal frequency division multiplexing (OFDM) for a downlink, and employs single carrier (SC)-frequency division multiple access (FDMA) for an uplink. The uplink (UL) refers to a wireless link for transmitting data or a control signal from a terminal (e.g., a user equipment (UE) or a mobile station (MS)) to a BS (or an evolved node B (eNB)), and the downlink (DL) refers to a wireless link for transmitting data or a control signal from the BS to the terminal. The above-described multiple access schemes generally distinguish between data or control information of different users by allocating time-frequency resources for the data or control information of the users not to overlap each other, i.e., to establish orthogonality therebetween.

As a post-LTE system, a 5G (or new radio (NR)) system needs to support services capable of reflecting and satisfying various requirements of users, service providers, etc. Services considered for the 5G system include enhanced mobile broadband (eMBB), massive machine-type communication (mMTC), and ultra-reliability low-latency communication (URLLC) services.

The eMBB service is aimed to provide an enhanced data rate compared to a data rate supported by LTE, LTE-A, or LTE-Pro. For example, the eMBB service in the 5G system needs to provide a peak data rate of 20 gigabits per second (Gbps) for a DL and provide a peak data rate of 10 Gbps for a UL in view of a single BS. At the same time, an increased user-perceived data rate needs to be provided. To satisfy these requirements, enhanced transceiving technology including enhanced multiple-input and multiple-output (MIMO) is required. The data rate required for the 5G system may be satisfied by using a frequency bandwidth wider than 20 megahertz (MHz) in a frequency band of 3 to 6 gigahertz (GHz) or over 6 GHz instead of a 2 GHz band currently used for LTE.

At the same time, the mMTC service in the 5G system is considered to support application services such as the IoT. The mMTC service is required to, for example, support massive user access within a cell, enhance terminal coverage, increase battery time, and reduce user charges, to efficiently provide the IoT service. The IoT service provides a communication function by using a variety of sensors attached to various devices, and thus needs to support a large number of terminals within a cell (e.g., 1,000,000 terminals/km2). In addition, since terminals supporting mMTC may be located in a shadow zone, e.g., a basement of a building, due to service characteristics, the mMTC service requires a wider coverage compared to other services provided by the 5G system. The terminals supporting mMTC need to be low-priced and are not able to frequently replace batteries, and thus require very long battery life times.

Lastly, the URLLC service is a mission-critical cellular-based wireless communication service used for remote control of robots or machinery, industrial automation, unmanned aerial vehicles, remote healthcare, emergency alert, etc., and needs to provide ultra-low-latency and ultra-reliability communication. For example, the URLLC service needs to satisfy an air interface latency less than 0.5 millisecond (ms) and, at the same time, requires a packet error rate equal to or less than 10-5. Therefore, for the URLLC service, the 5G system needs to provide a smaller transmit time interval (TTI) compared to other services and, at the same time, is required to allocate wide resources in a frequency band.

The above-described services considered for the 5G system need to be integrated and provided based on a single framework. That is, for efficient resource management and control, the services may not operate independently and may be integrally controlled and provided by a single system.

Hereinafter, a frame structure of LTE, LTE-A, and 5G systems will be described with reference to the drawings, and then a direction of designing the 5G system will be described.

FIG. 1 is a diagram showing a basic structure of a time-frequency resource region corresponding to a wireless resource region of a wireless communication system based on cyclic prefix (CP)-OFDM or SC-FDMA according to an embodiment of the disclosure.

Herein, the wireless communication system based on CP-OFDM or SC-FDMA may include at least one of LTE, LTE-A, and 5G systems. However, the above-mentioned systems are merely examples, and the wireless communication system based on CP-OFDM or SC-FDMA is not limited thereto.

Referring to FIG. 1, in the time-frequency resource region, a horizontal axis indicates the time domain, and a vertical axis indicates the frequency domain. In this specification, a wireless link for transmitting data or a control signal from a terminal to a BS will be described as a UL, and a wireless link for transmitting data or a control signal from the BS to the terminal will be described as a DL.

A minimum transmission unit in the time domain of the LTE, LTE-A, and 5G systems is an OFDM symbol or an SC-FDMA symbol, and $N_{symb}$ symbols 105 may configure a slot 115. In the LTE and LTE-A systems, two slots each including seven symbols may configure a subframe 140.

The 5G system may support two slot structures, e.g., a slot structure and a mini-slot (or non-slot) structure. In the slot structure of the 5G system, $N_{symb}$ may be set to be one of 7 and 14. In the mini-slot structure of the 5G system, $N_{symb}$ may be set to be one of 1, 2, 3, 4, 5, 6, and 7.

In the LTE and LTE-A systems, the length of a slot is fixed to 0.5 ms, and the length of the subframe 140 is fixed to 1.0 ms. However, in the 5G system, the length of the slot or mini-slot structure may flexibly vary depending on subcarrier spacing. In the LTE and LTE-A systems, a radio frame 135 is a time-domain unit including 10 subframes. A minimum transmission unit in the frequency domain of the LTE and LTE-A systems is a 15 kilohertz (kHz) subcarrier (subcarrier spacing=15 kHz), and a bandwidth of overall transmission bands of the system may correspond to a total of $N_{BW}$ subcarriers 110. A flexibly extended frame structure of the 5G system will be described in detail below with reference to FIGS. 2 to 4.

A basic unit of resources in the time-frequency domain is a resource element (RE) 130, and the RE 130 may be indicated by at least one of an OFDM symbol index, a SC-FDMA symbol index, and a subcarrier index. A resource block (RB) (or physical resource block (PRB)) 120 may be defined as $N_{symb}$ symbols 105 (e.g., $N_{symb}$ OFDM symbols or $N_{symb}$ SC-FDMA symbols) in the time domain, and as $N_{BB}$ consecutive subcarriers 125 in the frequency domain. Therefore, the RB 120 may include $N_{symb} \times N_{RB}$ REs 130.

$N_{symb}$ corresponding to the number of OFDM symbols may be determined based on the length of a CP added to every symbol to prevent intersymbol interference. For example, $N_{symb}$ may be determined to be 7 in a case when a normal CP is used, or may be determined to be 6 in a case when an extended CP is used. To maintain orthogonality between symbols, compared to the normal CP, the extended CP may be used for a system having a long propagation distance.

The subcarrier spacing, the CP length, or the like is essential information for OFDM transceiving, and appropriate transceiving may be performed only when a BS and a terminal obtain the information as a common value.

The above-described frame structure of the LTE and LTE-A systems is designed in consideration of general voice or data communication, and may not be easily extended to satisfy various services and requirements for the 5G system. Therefore, for the 5G system, in consideration of various services and requirements, a frame structure needs to be flexibly defined and used.

Figure 2:
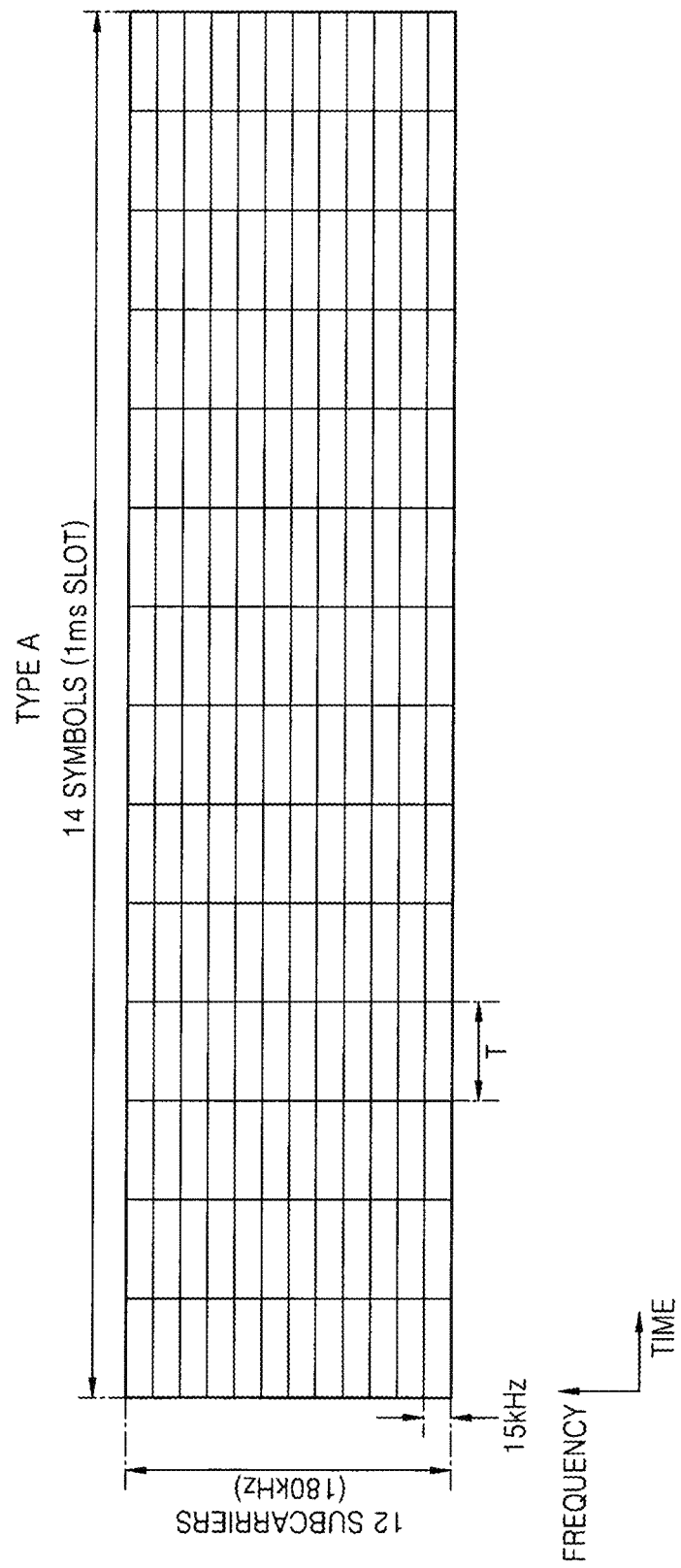
FIGS. 2, 3, and 4 are diagrams for describing extended frame structures of a 5th generation communication (5G) system, according to various embodiments of the disclosure.
Figure 3:
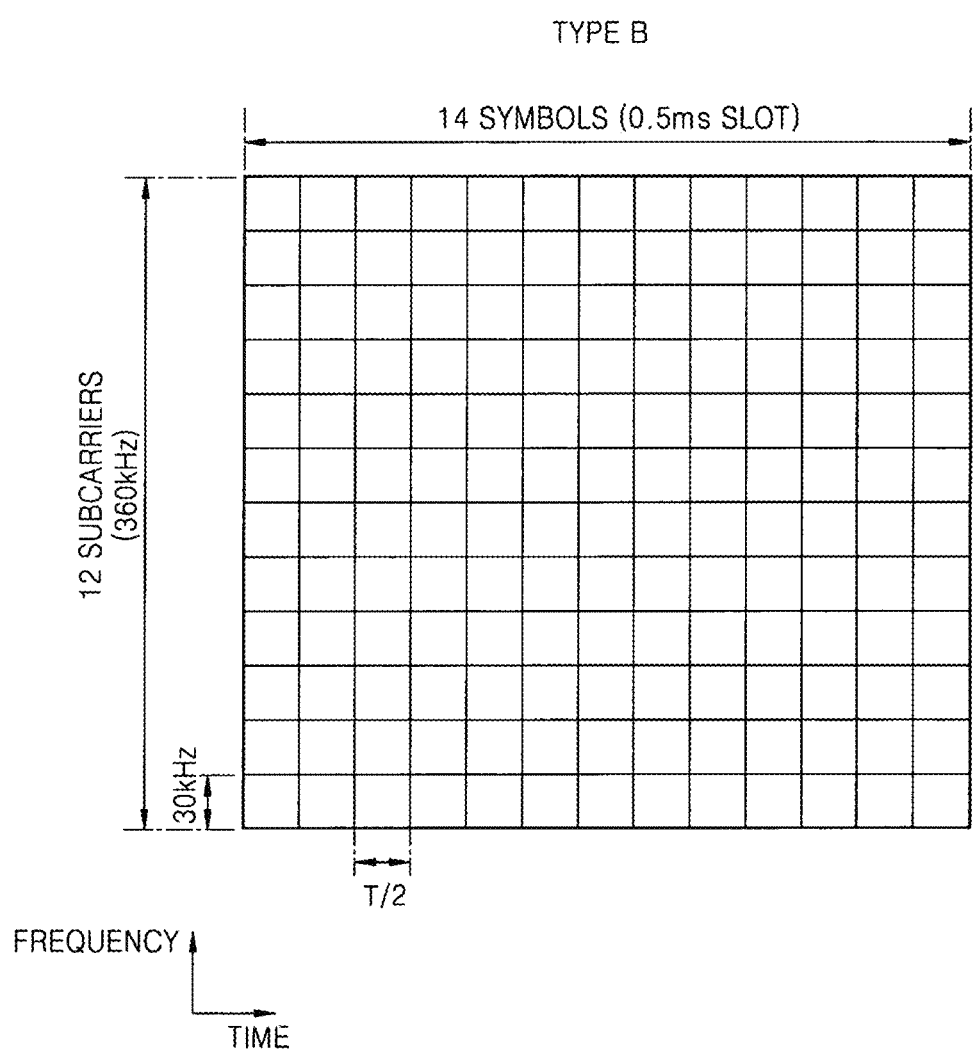
Figure 4:
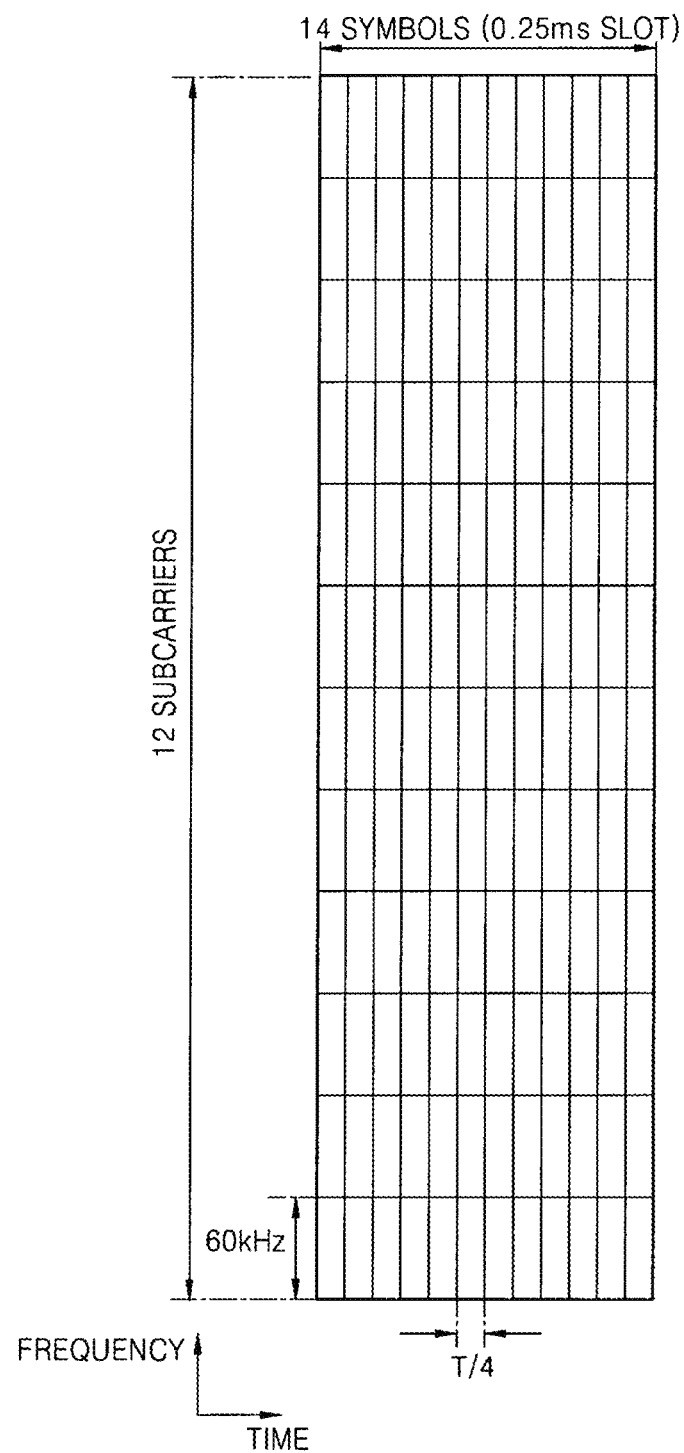

FIGS. 2 to 4 are diagrams for describing extended frame structures of a 5G system, according to various embodiments of the disclosure.

At an early stage of introduction of the 5G system in the future, coexistence or dual mode operation of the 5G system and an existing LTE/LTE-A system is expected. As such, the existing LTE/LTE-A system may serve to provide stable system operation, and the 5G system may serve to provide enhanced services. Therefore, the extended frame structures of the 5G system need to include at least a frame structure or parameter set of the LTE/LTE-A system.

Referring to FIGS. 2 to 4, a subcarrier spacing, a CP length, and a slot length will be described as examples of essential parameters for defining the extended frame structure. A basic time unit for scheduling in the 5G system may be a slot. However, the slot is merely an example, and the basic time unit for scheduling may vary depending on settings.

FIG. 2 illustrates a frame structure or parameter set of the 5G system, which equals the frame structure or parameter set of the LTE/LTE-A system. Referring to FIG. 2, in frame structure type A, a subcarrier spacing may be 15 kHz, 14 symbols may configure a 1 ms slot, and 12 subcarriers (=180 kHz=12×15 kHz) may configure a PRB.

FIG. 3 illustrates frame structure type B. Referring to FIG. 3, in frame structure type B, a subcarrier spacing may be 30 kHz, 14 symbols may configure a 0.5 ms slot, and 12 subcarriers (=360 kHz=12×30 kHz) may configure a PRB. The subcarrier spacing and the PRB size of frame structure type B may be two times greater than those of frame structure type A, and the slot length and the symbol length of frame structure type B may be two times less than those of frame structure type A.

FIG. 4 illustrates frame structure type C. Referring to FIG. 4, in frame structure type C, a subcarrier spacing may be 60 kHz, 14 symbols may configure a 0.25 ms slot, and 12 subcarriers (=720 kHz=12×60 kHz) may configure a PRB. The subcarrier spacing and the PRB size of frame structure type C may be four times greater than those of frame structure type A, and the slot length and the symbol length of frame structure type C may be four times less than those of frame structure type A.

That is, the frame structure types described above in relation to FIGS. 2 to 4 may be generalized as described below. The 5G system according to an embodiment may provide high expandability by determining the subcarrier spacing, the CP length, the slot length, etc. included in an essential parameter set of a frame structure type, to be integer times greater or less than those of other frame structure types.

In addition, a subframe having a fixed length of 1 ms may be defined to indicate a reference time unit irrespective of the frame structure types. As such, a subframe includes a slot in frame structure type A, includes two slots in frame structure type B, and includes four slots in frame structure type C.

The above-described frame structure types A, B, and C are merely examples for describing available extended frame structures, and the available extended frame structures according to embodiments are not limited thereto. According to another example, the subcarrier spacing of the frame structure may be set to be 120 kHz or 240 kHz.

The above-described frame structure types may be applied to various scenarios. In view of a cell size, since a longer CP length may support a larger cell, frame structure type A may support a larger cell compared to frame structure types B and C. In view of an operating frequency band, since a larger subcarrier spacing is more advantageous for restoration of phase noise of a high-frequency band, frame structure type C may support a higher operating frequency compared to frame structure types A and B. In view of a service, since a shorter subframe length is more advantageous for supporting of an ultra-low-latency service such as URLLC, frame structure type C may be more appropriate for the URLLC service compared to frame structure types A and B.

The above-described multiple frame structure types may be integrally operated in a system.

In LTE and LTE-A systems, a terminal may report E-UTRA bands supported by the terminal, through E-UTRA channel bandwidths defined as shown in Table 1. This means that the LTE and LTE-A terminal needs to support all channel bandwidths supported by the E-UTRA bands reported by the terminal.

TABLE 1

E-UTRA channel bandwidth (in 3GPP TS36.101)
E-UTRA Band/Channel Bandwidth

| E-UTRA Band | 1.4 MHz | 3 MHz | 5 MHz | 10 MHz | 15 MHz | 20 MHz |
|---|---|---|---|---|---|---|
| 1 | | | Yes | Yes | Yes | Yes |
| 2 | Yes | Yes | Yes | Yes | Yes1 | Yes1 |
| 3 | Yes | Yes | Yes | Yes | Yes1 | Yes1 |
| 4 | Yes | Yes | Yes | Yes | Yes | Yes |
| 5 | Yes | Yes | Yes | Yes1 | | |
| 6 | | | Yes | Yes1 | | |
| 7 | | | Yes | Yes | Yes3 | Yes1, 3 |
| 8 | Yes | Yes | Yes | Yes1 | | |
| 9 | | | Yes | Yes | Yes1 | Yes1 |

The rest omitted

In an LTE system, the terminal may perform adaptive gain control (AGC) and appropriately adapt a dynamic range of an analog-to-digital converter (ADC) based on a cell-specific reference signal (CRS) periodically transmitted in a system bandwidth. Furthermore, in the LTE system, since the terminal needs to support overall system bandwidths settable in bands supported by the terminal and all resources in the system bandwidth are allocable for a physical downlink shared channel (PDSCH), the terminal does not need to perform radio frequency (RF) retuning within the set system bandwidth.

As described above, in a 5G system, to achieve ultra-high-speed data service of several Gbps, transceiving of signals in an ultra-wide bandwidth of several ten to several hundred MHz, or of several GHz is considered. In this case, since power consumption increases in proportion to a transceiving bandwidth, power consumption of the terminal or the BS needs to be efficiently managed by adapting the transceiving bandwidth. In particular, the terminal has a limited battery capacity, and thus efficient power consumption management therefor is essential.

Therefore, the terminal operating in the 5G system may be much burdened if the terminal is forced to support overall system bandwidths settable in given bands as in the LTE and LTE-A systems. As such, for efficient operation of the terminal in the 5G system, a bandwidth of the terminal needs to be adapted to support only a bandwidth part (BWP) narrower than the overall system bandwidths.

Since CRS, which is periodically transmitted in the overall system, bandwidths do not exist in the 5G system, a criterion for AGC and RF retuning of the terminal may be ambiguous. To solve this, terminal bandwidth adaptation methods and apparatuses according to the disclosure may provide a criterion for performing at least one of AGC and RF retuning of the terminal. A detailed description thereof will now be provided.

A wireless communication system according to an embodiment may set one or more BWPs of overall system bandwidths for each of terminals to reduce power consumption of the terminals in consideration of different capabilities of terminals. Herein, an activated BWP among the one or more BWPs may be allocated for a PDSCH. In this case, the terminal needs to perform AGC or RF retuning based on the set or activated BWP. The disclosure may provide a bandwidth adaptation method for performing AGC and RF retuning of a terminal in a wireless communication system having various frame structures as described above in relation to FIGS. 2 to 4.

Figure 5:
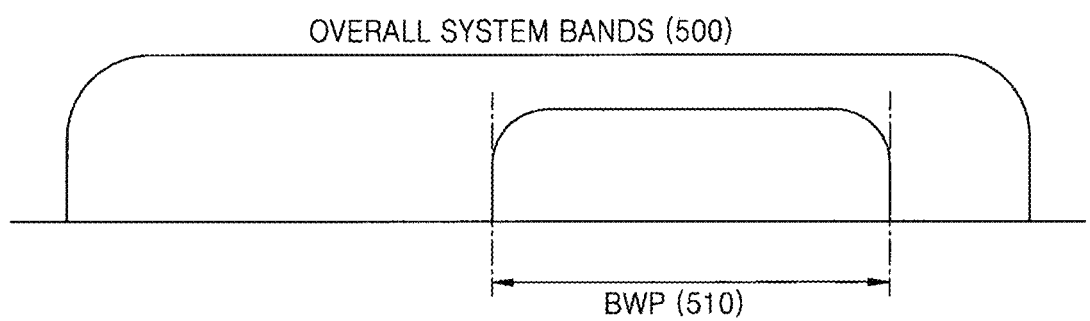
FIG. 5 is a diagram for describing a bandwidth allocated to a terminal, according to an embodiment of the disclosure.

FIG. 5 is a diagram for describing a bandwidth allocated to a terminal, according to an embodiment of the disclosure.

Referring to FIG. 5, a BS may set at least one BWP 510 including some of overall system bands (or overall carriers) 500, for a terminal through higher layer signaling. In this case, the BS may set one of the at least one BWP 510 as an activated BWP for the terminal through higher layer signaling or layer 1 (L1) signaling. Herein, when the set bandwidth is always the same as the activated BWP, one of the BWP setting procedure and the BWP activating procedure may be omitted.

When the BWP is activated, transmission or reception through a band other than the activated BWP may not be required to the terminal. For example, when the BS activates the at least one BWP 510 of the overall system bands (or overall carriers) 500 for the terminal, reception or transmission of a signal by the terminal in a band other than the activated at least one BWP 510 may not be assumed.

Figure 6:
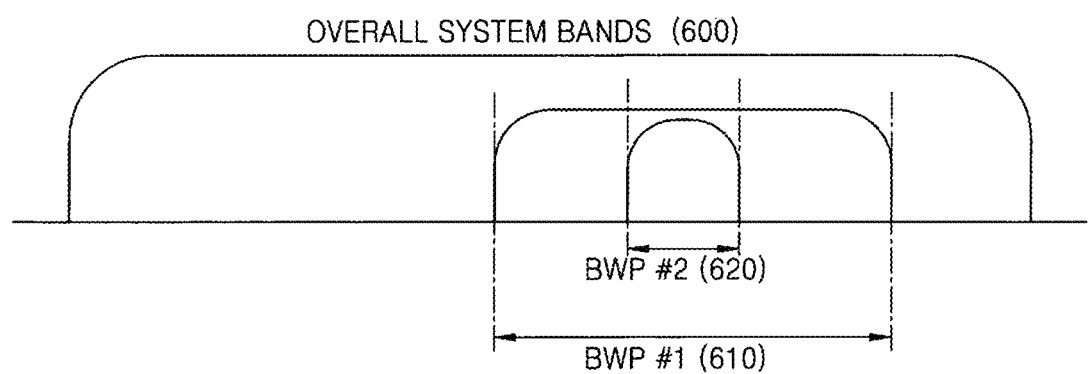
FIG. 6 is a diagram for describing a bandwidth allocated to a terminal, according to an embodiment of the disclosure.

FIG. 6 is a diagram for describing a bandwidth allocated to a terminal, according to an embodiment of the disclosure.

Referring to FIG. 6, a BS may set a plurality of BWPs 610 and 620 each including some of overall system bands (or overall carriers) 600, for a terminal through higher layer signaling. For example, the BS may set at least one of the plurality of BWPs 610 and 620 including BWP#1 having a wider bandwidth and BWP#2 having a narrower bandwidth, for the terminal.

In addition, the BS may set one of the plurality of BWPs 610 and 620 as an activated BWP through higher layer signaling or L1 signaling. As described above in relation to FIG. 5, transmission or reception through a band other than the activated BWP may not be required to the terminal. In this case, since the plurality of set BWPs 610 and 620 correspond to different bands, when necessary, the BS and the terminal may reduce energy consumption thereof by adapting a band usable for monitoring or transceiving during a given time.

According to an embodiment of the disclosure, a method, performed by a BS and a terminal, of efficiently performing AGC or RF retuning for bandwidth adaptation in a 5G system may be provided. The method of efficiently performing AGC or RF retuning for bandwidth adaptation will now be described in detail.

Embodiment 1: Terminal Bandwidth Adaptation Based on Transition Time

Since DL and UL transmission bands are determined by a BS, the BS may be previously prepared to transition a transmission band. However, a terminal may not be aware of transition of the transmission band before the BS directs to transition the transmission band, and thus needs to perform a few pre-operations for transceiving band adaptation from when transition of the transmission band is directed and until the transmission band is actually transitioned.

One of the pre-operations is RF retuning. When a frequency band of an RF device is temporarily limited to reduce power consumption of the RF device or when a low-priced RF device is used, the terminal may not receive or transmit signals of overall bands at a time. As such, when the band is adapted to a range exceeding a currently set transceivable band, the terminal may transition the transceivable band by adjusting an oscillator.

In addition, since a certain time is required to perform RF retuning and the terminal may not transmit or receive a signal during the RF retuning time, this may be considered when the BS allocates resources, according to an embodiment.

Another one of the pre-operations is terminal AGC. A description thereof will now be provided with reference to FIG. 7.

Figure 7:
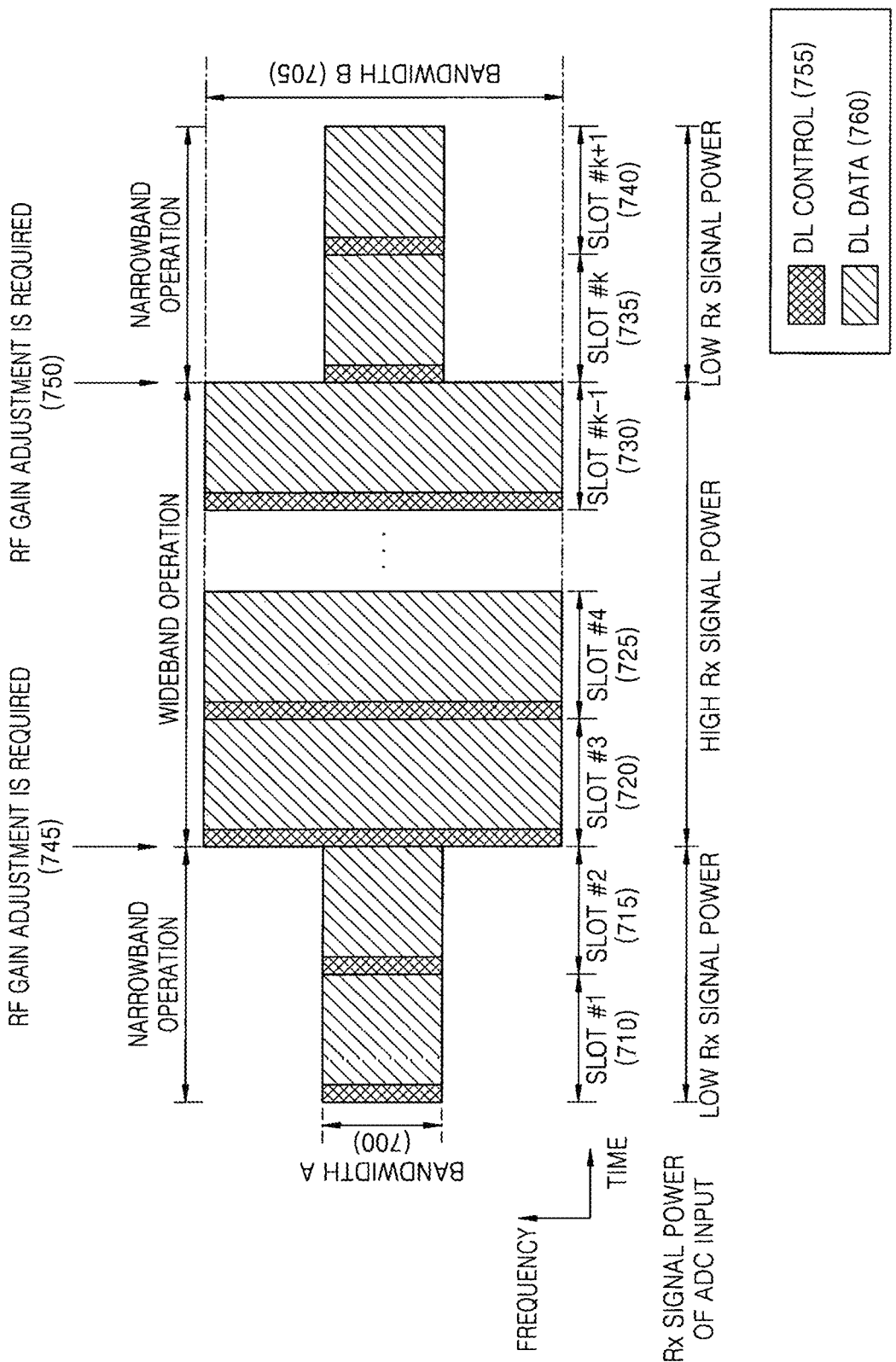
FIG. 7 is a diagram for describing a method of adapting a bandwidth of a terminal, according to an embodiment of the disclosure.

FIG. 7 is a diagram for describing a method of adapting a bandwidth of a terminal, according to an embodiment of the disclosure.

Referring to FIG. 7, it is assumed that a time taken for RF retuning is 0 and that a slot structure includes DL slots only. In the embodiment of FIG. 7, it is also assumed that slot#1 710 and slot#2 715 operate as a narrowband of bandwidth A 700, that slot#3 720 and slot#4 725 to slot#k−1 730 operate as a wideband of bandwidth B 705, and that slot#k 735 and slot#k+1 740 operate as the narrowband of the bandwidth A 700.

Referring to FIG. 7, a DL control channel 755 may be transmitted in a first portion of each slot, and a DL data channel 760 may be transmitted in a second portion subsequent to the first portion. In this case, when REs have the same transmission power value, power values of signals received by the terminal in the slots 710, 715, 735, and 740 corresponding to the narrowband of the bandwidth A 700 and the slots 720, 725, and 730 corresponding to the wideband of the bandwidth B 705 may be determined in proportion to the number of REs included in each band.

When a BS transmits signals having different power values to the terminal through different bandwidths, the terminal may receive the signals as analog signals. The terminal may convert the received analog signals into digital signals by using an ADC. The terminal may perform subsequent signal processing, e.g., data decoding, on the converted digital signals.

Since the ADC of the terminal has a limited dynamic range, the dynamic range needs to be re-adapted based on power values of reception signals. For example, when the reception signals have an average power value of 1, the dynamic range of the ADC of the terminal may be adapted to {0-2}. When the average power value of the reception signals is changed to 10, the dynamic range of the ADC of the terminal needs to be adapted to {0-20} based on the average power value of the reception signals. When the average power value of the reception signals of the terminal is changed but a dynamic range of the ADC of the terminal is maintained as {0-2}, all reception signals having reception power values greater than 2 may be regarded as 2. As such, a quantization error may occur and thus reception performance of the terminal may be degraded.

Adaptation of the dynamic range of the ADC of the terminal may be needed not only in a case (e.g., 745) when a band of the terminal is transitioned from a narrowband to a wideband but also in a case (e.g., 750) when a band of the terminal is transitioned from a wideband to a narrowband.

Influence of bandwidth adaptation on the terminal may vary depending on a timing when bandwidth adaptation is performed. A description thereof will now be provided with reference to FIGS. 8 and 9.

Figure 8:
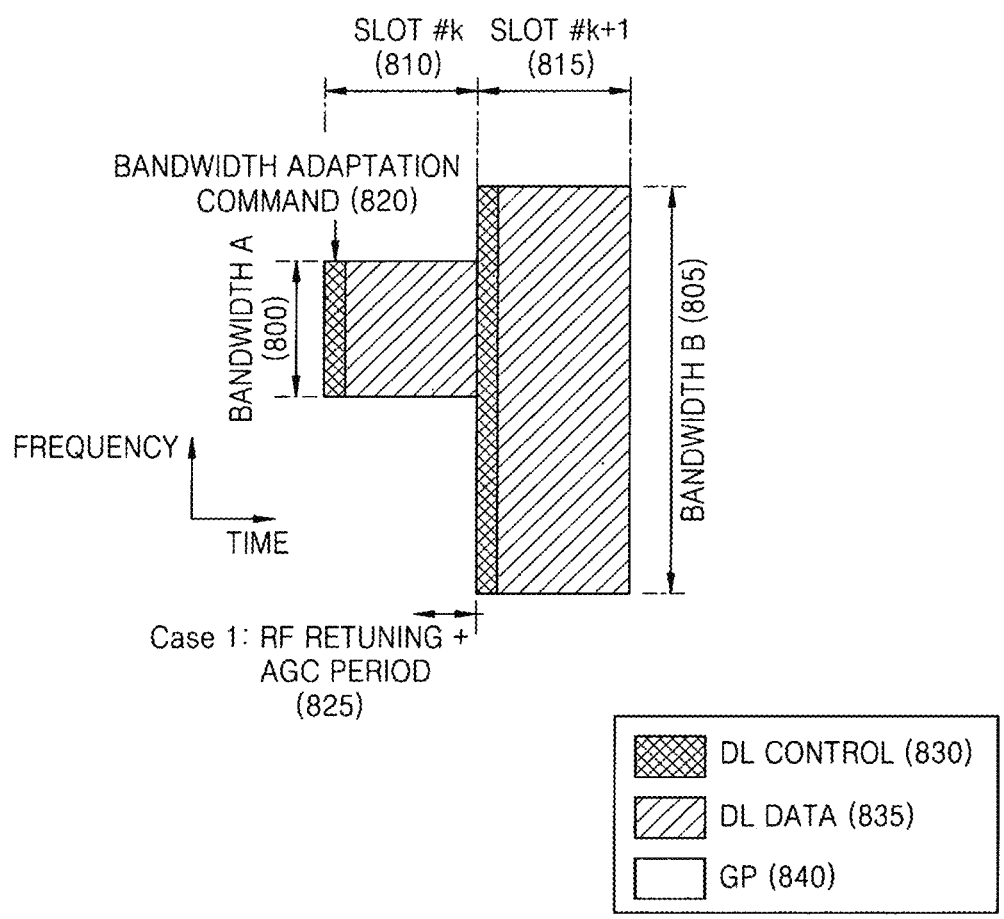
FIG. 8 is a diagram for describing a method, performed by a terminal, of previously adapting a bandwidth before bandwidth transition is started, according to an embodiment of the disclosure.

FIG. 8 is a diagram for describing a method, performed by a terminal, of previously adapting a bandwidth before bandwidth transition is started, according to an embodiment of the disclosure.

Referring to FIG. 8, a slot may include a DL control channel 830, a DL data channel 835, and a guard period (GP) 840. The terminal according to an embodiment may receive a bandwidth adaptation command 820 in a control channel of slot#k 810 prior to slot#k+1 815 in which a bandwidth A 800 is transitioned. However, the slot#k 810 is merely an example, and the location of a slot in which the bandwidth adaptation command 820 is received is not limited thereto. According to another example, the terminal may receive the bandwidth adaptation command 820 in a control channel of a slot away from the slot#k+1 815 in which the bandwidth is transitioned, by a certain time. According to still another example, the terminal may receive the bandwidth adaptation command 820 through higher layer signaling such as radio resource control (RRC) signaling or media access control (MAC)-control element (CE) signaling.

The terminal may previously perform bandwidth adaptation before the slot#k+1 815 in which the bandwidth is transitioned starts. For example, the terminal may perform at least one of RF retuning and AGC 825 in at least one symbol location in the slot#k 810 before the slot#k+1 815 starts.

In the embodiment of FIG. 8, when the terminal previously performs at least one of RF retuning and AGC before the slot#k+1 815 in which the bandwidth is transitioned, the terminal may receive all signals of the transitioned band from the first symbol of the slot#k+1 815. However, the terminal may not receive some symbols of the slot#k 810 while at least one of RF retuning and AGC 825 is being performed in the at least one symbol location in the slot#k 810, and may not easily predict or measure a reception power value of the slot#k+1 815.

Figure 9:
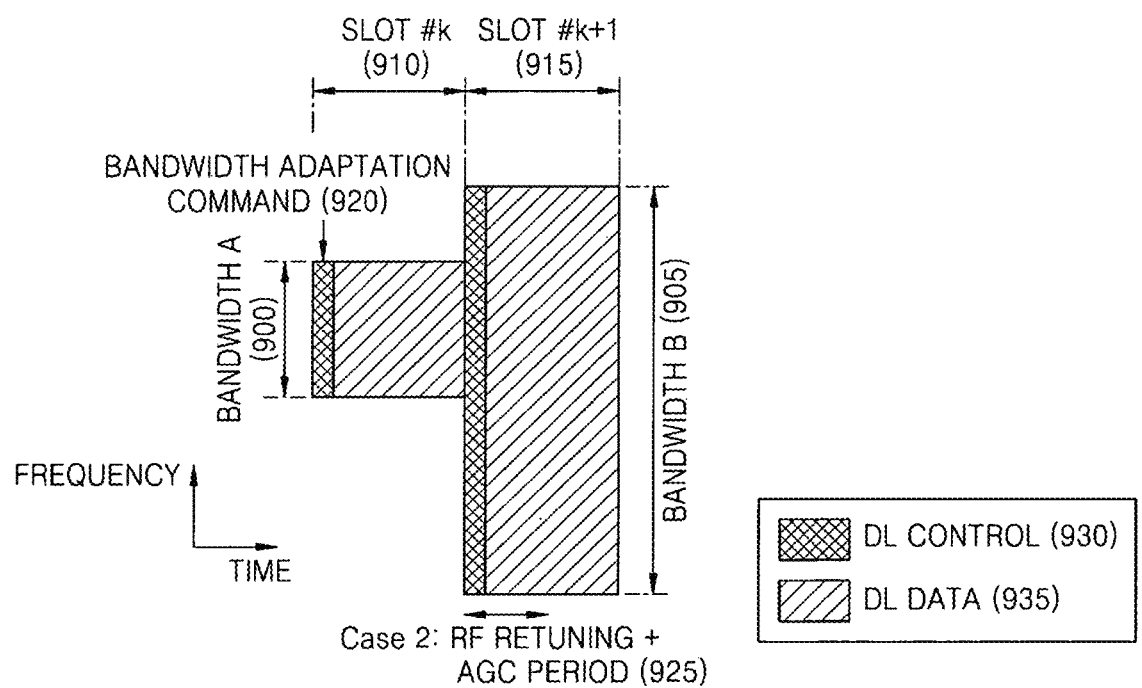
FIG. 9 is a diagram for describing a method, performed by a terminal, of adapting a bandwidth after bandwidth transition is started, according to an embodiment of the disclosure.

FIG. 9 is a diagram for describing a method, performed by a terminal, of adapting a bandwidth after bandwidth transition is started, according to an embodiment of the disclosure.

Referring to FIG. 9, the terminal according to an embodiment may receive a bandwidth adaptation command 920 in a control channel of slot#k 910 prior to slot#k+1 915 in which a bandwidth A 900 is transitioned. However, the slot#k 910 is merely an example, and the location of a slot in which the bandwidth adaptation command 920 is received is not limited thereto. According to another example, the terminal may receive the bandwidth adaptation command 920 in a control channel of a slot away from the slot#k+1 915 in which the bandwidth is transitioned, by a certain time. According to still another example, the terminal may receive the bandwidth adaptation command 920 through higher layer signaling such as RRC signaling or MAC CE signaling.

The terminal may perform bandwidth adaptation after the slot#k+1 915 in which the bandwidth is transitioned starts. For example, the terminal may perform at least one of RF retuning and AGC 925 in at least one symbol location in the slot#k+1 915 after the slot#k+1 915 starts.

In the embodiment of FIG. 9, when the terminal performs at least one of RF retuning and AGC in the slot#k+1 915 after transition of the bandwidth is started, the terminal may receive all signals to the last symbol of the slot#k 910, and may perform bandwidth adaptation by receiving a signal transitioned when the band is transitioned). However, the terminal may not receive some initial symbols of the slot#k+1 915 in which the bandwidth is transitioned, during a period in which bandwidth adaptation is performed. In addition, distortion may occur in a specific RE of the some initial symbols of the slot#k+1 915.

As described above in relation to FIGS. 8 and 9, since different problems occur depending on a band adaptation timing of the terminal, a BS may support band adaptation based on different methods depending on the band adaptation timing.

In the embodiments of FIGS. 8 and 9, the band adaptation methods of the terminal have been described on the assumption of a slot structure including DL slots each including a DL control channel and a DL data channel. However, the slot structure including DL slots is merely an example, and the above-described bandwidth adaptation methods of the terminal may also be applied to a slot structure including both UL and DL slots. A description thereof will now be provided with reference to FIG. 10.

Figure 10:
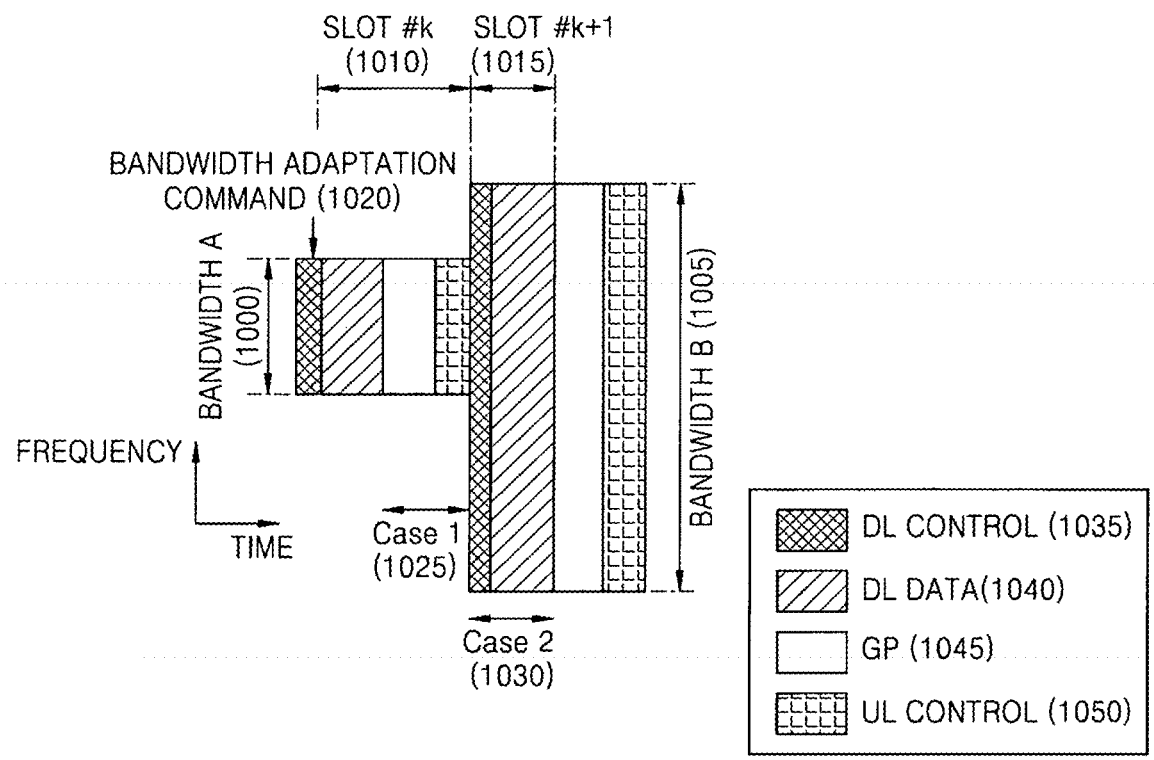
FIG. 10 is a diagram for describing a method, performed by a terminal, of adapting a bandwidth in a slot structure including both downlink (DL) and uplink (UL) slots, according to an embodiment of the disclosure.

FIG. 10 is a diagram for describing a method, performed by a terminal, of adapting a bandwidth in a slot structure including both DL and UL slots, according to an embodiment of the disclosure.

Referring to FIG. 10, a slot may include a DL control channel 1035, a DL data channel 1040, a guard period (GP) 1045, and a UL control channel 1050. However, the above-mentioned components are merely examples, and the structure of the slot is not limited thereto. According to another example, the slot may further include a UL data channel (not shown). The terminal according to an embodiment may receive a bandwidth adaptation command 1020 in the DL control channel 1035 of slot#k 1010 or at the location of a certain symbol of a prior slot thereof. According to another example, the terminal may receive the bandwidth adaptation command 1020 through higher layer signaling.

The bandwidth adaptation methods described above in relation to FIGS. 8 and 9 may also be applied to the slot structure including both DL and UL slots. For example, in a first case, the terminal may adapt a bandwidth A 1000 in at least one symbol location 1025 in the slot#k 1010 before the bandwidth A 1000 is transitioned to bandwidth B 1005 as in slot#k+1 1015. According to another example, in a second case, the terminal may adapt the bandwidth A 1000 in at least one symbol location 1030 after bandwidth transition is started in the slot#k+1 1015.

Embodiment 2: Terminal Bandwidth Adaptation Based on Non-Zero Power (NZP)-Reference Signal (RS)

In the current embodiment, a method of supporting bandwidth adaptation for performing at least one of RF retuning and AGC, based on an NZP-RS in various situations described above in Embodiment 1 will be described.

To support AGC of a terminal, a BS according to an embodiment may provide an RS transmitted in a band to be transitioned or a wider band including the band to be transitioned, to the terminal before or after a band adaptation timing. Herein, the RS transmitted to support AGC may include a known RS, e.g., a channel status information (CSI)-RS, a physical broadcast channel (PBCH)-demodulation reference signal (DMRS), a physical downlink control channel (PDCCH)-DMRS, or a PDSCH-DMRS. According to another example, an RS newly defined for AGC may be used. For convenience of explanation, the RS for supporting AGC is referred to as an AGC-RS.

The CSI-RS is one of NZP-RSs most appropriately usable as the AGC-RS. The CSI-RS may have a variable transmission bandwidth. For example, a wideband CSI-RS may have a band such as a full band receivable by a terminal at a time, and a partial-band CSI-RS may have a bandwidth of a BWP. As such, the CSI-RS may effectively support bandwidth adaptation of the terminal.

In addition, since the CSI-RS has a regular RE pattern, when a reception power value for AGC is measured, configuration complexity of the terminal may be reduced. For example, the RE pattern of the CSI-RS may have the same RE spacing within a PRB or have the same RE spacing or RE group spacing within a set band. To accurately perform AGC, it may be assumed that a power value of an antenna port for AGC-RS transmission is the same as the power value of an antenna port for PDSCH transmission. According to another example, when the power value of the AGC-RS antenna port differs from the power value of the antenna port for PDSCH transmission, the BS may inform the terminal about a difference or ratio therebetween.

The terminal according to an embodiment may determine presence of the AGC-RS in at least one of an implicit manner and an explicit manner. A detailed description thereof will now be provided with reference to FIGS. 8, 9, and 11.

Implicit manner: when a bandwidth adapted based on a bandwidth adaptation command is greater or less than a previous bandwidth, a terminal may assume that an AGC-RS is present at a preset location and a port number. Herein, the preset location and the port number may have different values depending on a bandwidth adaptation timing of the terminal, which is described above in Embodiment 1. For example, when the terminal previously performs bandwidth adaptation before the slot#k+1 815 in which the bandwidth is transitioned starts, as illustrated in FIG. 8, the AGC-RS may be transmitted over bandwidth B 805 to be transitioned on the assumption of a single port at the last usable AGC-RS OFDM symbol location of the slot#k 810 prior to bandwidth transition.

The AGC-RS may be an NZP-CSI-RS.

Figure 11:
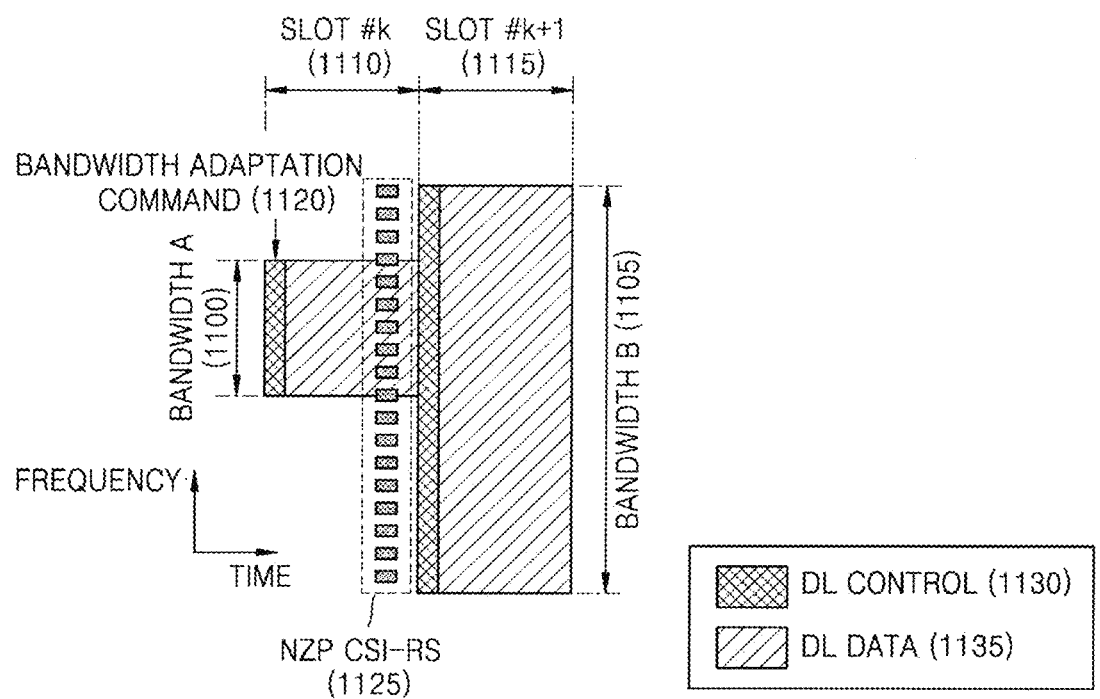
FIG. 11 is a diagram for describing a method of adapting a bandwidth based on a non-zero power (NZP)-channel status information (CSI)-reference signal (RS), according to an embodiment of the disclosure.

FIG. 11 is a diagram for describing a method of adapting a bandwidth based on an NZP-CSI-RS 1125, according to an embodiment of the disclosure.

Referring to FIG. 11, a slot may include a DL control channel 1130 and a DL data channel 1135. When a terminal previously performs bandwidth adaptation according to a bandwidth adaptation command 1120 before slot#k+1 1115 in which bandwidth A 1100 is transitioned starts, the NZP-CSI-RS 1125 may be transmitted over bandwidth B 1105 to be transitioned on the assumption of a single port at the last AGC-RS OFDM symbol location of slot#k 1110 prior to bandwidth transition.

Herein, when the NZP-CSI-RS 1125 is used as an AGC-RS, an example of a pattern thereof may be similar to the pattern illustrated in FIG. 11.

As another example, as described above in relation to FIG. 9, when the terminal performs bandwidth adaptation such as RF retuning or AGC after the slot#k+1 915 or the slot#k+1 1115 in which the bandwidth is transitioned starts, the AGC-RS may be transmitted over bandwidth B 905 or bandwidth 1105 to be transitioned on the assumption of a single port at the first usable AGC-RS OFDM symbol location of the slot#k+1 915 or the slot#k+1 1115 in which the band is transitioned. When the AGC-RS is an NZP-CSI-RS and when, in the embodiment of FIG. 9, the NZP-CSI-RS is transmittable at an OFDM symbol location, e.g., a DL control channel 930 of the slot#k+1 915, the NZP-CSI-RS may be set to be transmitted at the OFDM symbol location. If the NZP-CSI-RS is transmitted over the bandwidth B 905 to be transmitted only in a DL data channel 935 of the slot#k+1 915 in which the band is transitioned, a BS may transmit the NZP-CSI-RS over the bandwidth B 905 to be transitioned on the assumption of a single port at the first usable CSI-RS OFDM symbol of the DL data channel 935 of the slot#k+1 915.

Explicit manner 1: When it is predicted that a terminal needs to adapt a bandwidth and that AGC of the terminal needs to be reset due to bandwidth adaptation, a BS may set an AGC-RS to be signaled from a higher layer or set an aperiodic (Ap)-AGC-RS to be triggered through L1 signaling.

When the terminal uses a periodic (P)-CSI-RS or a semi-persistent (SP)-CSI-RS transmitted through higher layer signaling, terminal bandwidth adaptation above a certain level may be performed only within a certain time from when an AGC-RS is transmitted. In this case, when terminal bandwidth adaptation above the certain level is directed, the terminal may assume that the most recent AGC-RS from a bandwidth transition timing is being transmitted over a bandwidth to be transitioned. Alternatively, when terminal bandwidth adaptation above the certain level is directed, it may be assumed that the most recent AGC-RS from a bandwidth transition timing is a wideband CSI-RS.

When the terminal uses an Ap-CSI-RS, which is triggered through L1 signaling, as the AGC-RS, since the Ap-CSI-RS may be triggered in all slots, limitations on a bandwidth adaptation timing of the terminal may be reduced compared to a case when a P-CSI-RS or a SP-CSI-RS is used as the AGC-RS. When the Ap-CSI-RS and band transition are simultaneously triggered or when the Ap-CSI-RS is triggered in a slot immediately before or after band transition of the terminal, the terminal may assume that the Ap-CSI-RS is usable as the AGC-RS. In this case, the BS and the terminal may assume that the Ap-CSI-RS for AGC is transmitted at a usable CSI-RS OFDM symbol closest to a slot in which the band is transitioned, by ignoring an originally set CSI-RS OFDM symbol location value similar to the above-described examples. Herein, the usable CSI-RS OFDM symbol may be determined based on a UL-DL configuration of the slot.

Explicit manner 2: Another example of explicitly setting an AGC-RS is to use CSI settings. A 5G (or NR) system may support 'RS settings,' 'CSI reporting settings,' and 'measurement settings' to report CSI. A BS may set one or more 'RS settings,' 'CSI reporting settings,' and 'measurement settings' for a terminal. The RS setting may include a RS setting for measuring CSI, the CSI reporting setting may include a setting about a method of reporting the generated CSI, and the measurement setting may include information about relationships (links) between the one or more RS settings and the CSI reporting settings.

When a specific RS is used as the AGC-RS, the BS may not connect the CSI reporting setting to the RS. As such, the terminal may determine that the RS is not used for channel status reporting and is used for AGC.

In the current embodiment, to set the AGC-RS, the above-described explicit and implicit manners may not be mutually exclusive and may be used in combination. The setting of a band of the AGC-RS or the assumption of the terminal are commonly applicable to the explicit and implicit manners.

Embodiment 3: Terminal Band (Width) Adaptation Based on Zero-Power (ZP)-RS or GP In the current embodiment, a method of adapting a band of a terminal based on a ZP-RS or a GP will be described with reference to FIG. 12.

Figure 12:
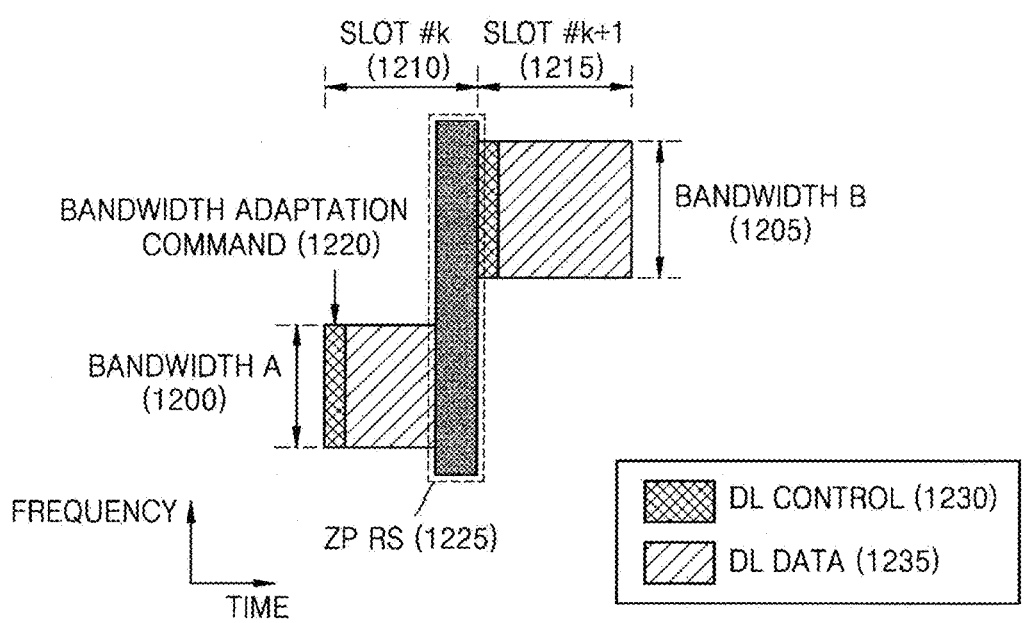
FIG. 12 is a diagram for describing a method of adapting a band of a terminal, based on a zero-power (ZP)-RS or a guard period (GP), according to an embodiment of the disclosure.

FIG. 12 is a diagram for describing a method of adapting a band of a terminal based on a ZP-RS or a GP, according to an embodiment of the disclosure. As described above in Embodiments 1 and 2, when the bandwidth of the terminal is transitioned above a certain level, the terminal may perform RF retuning and AGC.

Referring to FIG. 12, a slot may include a DL control channel 1230 and a DL data channel 1235. When the bandwidth of the terminal is similarly maintained but a band of the terminal is transitioned, since a slot prior to bandwidth transition and a slot subsequent to bandwidth transition have similar reception power values, the terminal may perform RF retuning without performing AGC. For example, in FIG. 12, since slot#k 1210 prior to bandwidth transition of bandwidth A 1200 according to a bandwidth adaptation command 1220 and slot#k+1 1215 subsequent to the bandwidth transition have similar reception power values, AGC does not need to be performed but RF retuning of the terminal may be required. In this case, a BS may secure an RF retuning time of the terminal by performing operations described below.

A first method is a method of setting a ZP-RS in at least one OFDM symbol located at the end of the slot#k 1210 immediately prior to bandwidth transition. The ZP-RS is an RS used to designate rate matching of a PDSCH, and may share an RE pattern with an NZP-CSI-RS. However, the above-described ZP RE pattern is merely an example, and a new ZP RE pattern may be defined according to another example.

In any slot structure, at least one OFDM symbol may be set to include a ZP-RS only. In operation based on a P-ZP-RS or a semi persistent (SP)-ZP-RS, band adaptation of the terminal may be performed in a slot including the P-ZP-RS or the SP-ZP-RS. In operation based on an Ap-ZP-RS, the terminal may set and trigger a ZP-RS 1225 in at least one OFDM symbol at the end of the slot#k 1210 in which the band is transitioned. In both of the above-described two cases, all REs of the ZP-RS OFDM symbols may be set for the ZP-RS 1225 to secure the RF retuning time of the terminal.

A second method is a method of securing the RF retuning time of the terminal based on a UL-DL slot structure. A BS may set a GP or a UL-related part (e.g., a UL control channel or a UL data channel) to be longer than the RF retuning time of the terminal in the slot#k 1210 immediately prior to band(width) transition. The terminal may perform RF retuning during the set time. The terminal may perform UL RF retuning after the GP or the UL-related part of the slot#k 1210 ends and until the UL-related part of a subsequent slot thereof, i.e., the slot#k+1 1215, starts.

A third method is a method of designating an end part of the slot#k 1210 prior to band(width) transition, in such a manner that a distance between the end part of the slot#k 1210 prior to band(width) transition, and a subsequent slot thereof, i.e., the slot#k+1 1215, is longer than the RF retuning time of the terminal. A subsequent process may correspond to that of the above-described method of securing the RF retuning time of the terminal based on a UL-DL slot structure.

Embodiment 4: Terminal Bandwidth Adaptation Based on Adaptation of Number of PDCCH OFDM Symbols If a terminal performs bandwidth adaptation at the at least one symbol location after a band transition timing as illustrated in FIG. 9, the terminal may adapt a bandwidth of the terminal by using a PDCCH OFDM symbol.

Figure 13:
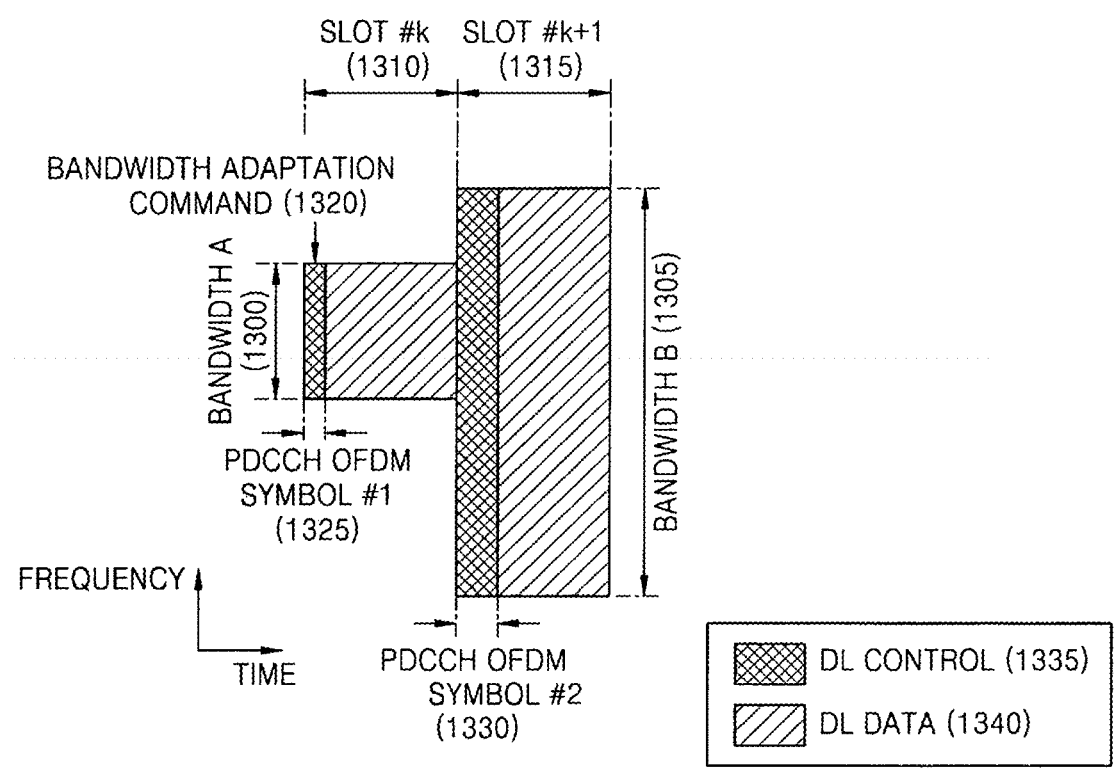
FIG. 13 is a diagram for describing a method of adapting a bandwidth of a terminal by using a physical downlink control channel (PDCCH) OFDM symbol, according to an embodiment of the disclosure.

FIG. 13 is a diagram for describing a method of adapting a bandwidth of a terminal by using a PDCCH OFDM symbol, according to an embodiment of the disclosure.

In the current embodiment, it is assumed that slot#k 1310 has bandwidth A 1300 and that slot#k+1 1315 has bandwidth B 1305.

Referring to FIG. 13, a slut may include a DL control channel 1335 and a DL data channel 1340. The DL control channel 1335 of the slot#k 1310 in which a band of the terminal is not transitioned compared to a prior slot thereof may include an arbitrary number of, e.g., 1, 2, or 3, PDCCH OFDM symbol #1 1325. However, in the slot#k+1 1315 in which the bandwidth is transitioned according to bandwidth adaptation command 1320, as 1 or 2 initial OFDM symbols are used to adapt the bandwidth of the terminal, the number of PDCCH OFDM symbol #2 1330 may be limited to 2 or 3. In this case, the PDCCH OFDM symbol #2 1330 not used to adapt the bandwidth of the terminal may not be included in a control channel element (CCE) of the terminal. A CCE of the terminal, which is transmitted at the PDCCH OFDM symbols used to adapt the bandwidth of the terminal, may be set to be transmitted only through the frequency domain included in the bandwidth A 1300 prior to bandwidth transition.

Figure 14:
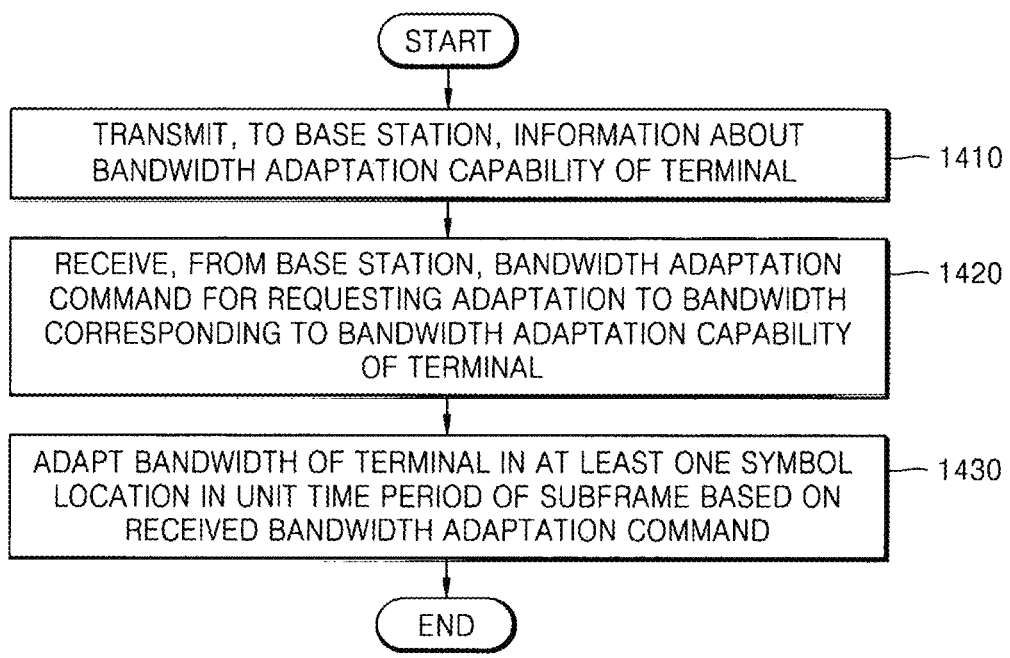
FIG. 14 is a flowchart of a method, performed by a terminal, of adapting a bandwidth, according to an embodiment of the disclosure.

FIG. 14 is a flowchart of a method, performed by a terminal, of adapting a bandwidth, according to an embodiment of the disclosure.

Referring to FIG. 14, in operation 1410, the terminal transmits, to a BS, information about bandwidth adaptation capability of the terminal. Herein, the information about the bandwidth adaptation capability of the terminal may include information about a band or bandwidth range settable by the terminal, an adjustable RF range of an oscillator, a reception input range of an ADC, etc. However, the above-mentioned types of information are merely examples, and the information about the bandwidth adaptation capability of the terminal is not limited thereto.

In operation 1420, the terminal receives, from the BS, a bandwidth adaptation command for requesting adaptation to a bandwidth corresponding to the bandwidth adaptation capability of the terminal. For example, the terminal may receive the bandwidth adaptation command from the BS through L1 signaling or higher layer signaling.

According to another embodiment, the terminal may receive slot format control information from the BS together with the bandwidth adaptation command. The slot format control information may include information about a slot length and information indicating whether a slot structure includes both UL and DL slots.

In operation 1430, the terminal adapts the bandwidth of the terminal in at least one symbol location in a unit time period of a subframe based on the received bandwidth adaptation command. Herein, the unit time period may be a slot or a mini-slot. However, the slot and the mini-slot are merely examples, and the unit time period is not limited thereto.

For example, the terminal may perform at least one of RF retuning and AGC in the at least one symbol location in the unit time period of the subframe. As bandwidth adaptation is completed, the terminal may transmit and receive signals to and from the BS within the adapted bandwidth.

The at least one symbol location in the unit time period of the subframe in which the bandwidth of the terminal is adapted may correspond to one of the bandwidth adaptation periods described above in relation to FIGS. 7 to 13.

According to another embodiment, after the BS detects the terminal and the bandwidth is adapted, when the bandwidth is to be adapted again, operation 1410 may be omitted.

Figure 15:
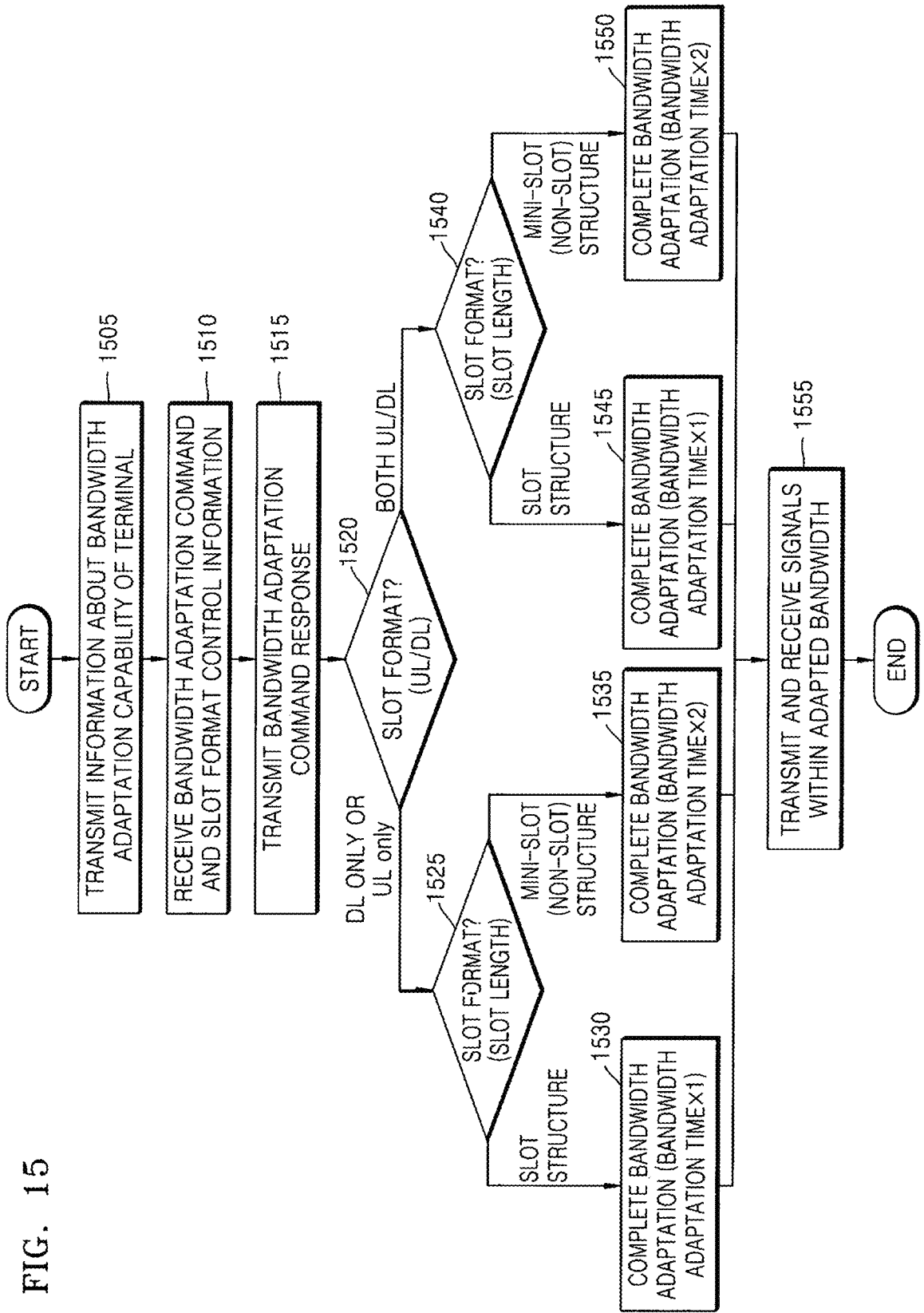
FIG. 15 is a flowchart of a method, performed by a terminal, of adapting a bandwidth, according to another embodiment of the disclosure.

FIG. 15 is a flowchart of a method, performed by a terminal, of adapting a bandwidth, according to another embodiment of the disclosure.

Referring to FIG. 15, in operation 1505, the terminal may transmit information about bandwidth adaptation capability of the terminal. For example, the terminal may transmit the information about the bandwidth adaptation capability thereof to a BS through terminal capability signaling.

Operation 1505 may correspond to operation 1410 described above in relation to FIG. 14.

In operation 1510, the terminal may receive a bandwidth adaptation command and slot format control information.

According to another example, the terminal may receive the bandwidth adaptation command only.

In operation 1515, as the bandwidth adaptation command is received from the BS, the terminal may transmit a bandwidth adaptation command response to the BS. Herein, the terminal may transmit the bandwidth adaptation command response to inform the BS that the bandwidth adaptation command is received.

In operation 1520, the terminal may determine whether a slot structure includes both DL and UL slots, based on the slot format control information.

In operation 1525, upon determining that the slot structure does not include both DL and UL slots, the terminal may check a slot length based on the slot format control information. Herein, the case when the slot structure does not include both DL and UL slots may indicate a case when the slot structure includes DL slots only or UL slots only. A slot format may be divided into a slot structure and a mini-slot structure based on the slot length. The slot structure may include 7 or 14 OFDM symbols, and the mini-slot (or non-slot) structure may include 1, 2, 3, 4, 5, 6, or 7 OFDM symbols. A bandwidth adaptation time may be determined based on the slot format.

In operation 1530, the terminal may complete bandwidth adaptation during a bandwidth adaptation time determined based on the slot format of the slot structure not including both DL and UL slots.

In operation 1535, the terminal may complete bandwidth adaptation during a bandwidth adaptation time determined based on the slot format of the mini-slot structure not including both DL and UL slots. Herein, the bandwidth adaptation time may be determined to be twice the bandwidth adaptation time described above in operation 1530. However, the above-described bandwidth adaptation time is merely an example, and the bandwidth adaptation time is not limited thereto.

In operation 1540, upon determining that the slot structure includes both DL and UL slots, the terminal may check the slot length based on the slot format control information.

In operation 1545, the terminal may complete bandwidth adaptation during a bandwidth adaptation time determined based on the slot format of the slot structure including both DL and UL slots.

In operation 1550, the terminal may complete bandwidth adaptation during a bandwidth adaptation time determined based on the slot format of the mini-slot structure including both DL and UL slots. Herein, the bandwidth adaptation time may be determined to be twice the bandwidth adaptation time described above in operation 1545. However, the above-described bandwidth adaptation time is merely an example, and the bandwidth adaptation time is not limited thereto.

In operation 1555, the terminal may transmit and receive signals within the adapted bandwidth.

Figure 16:
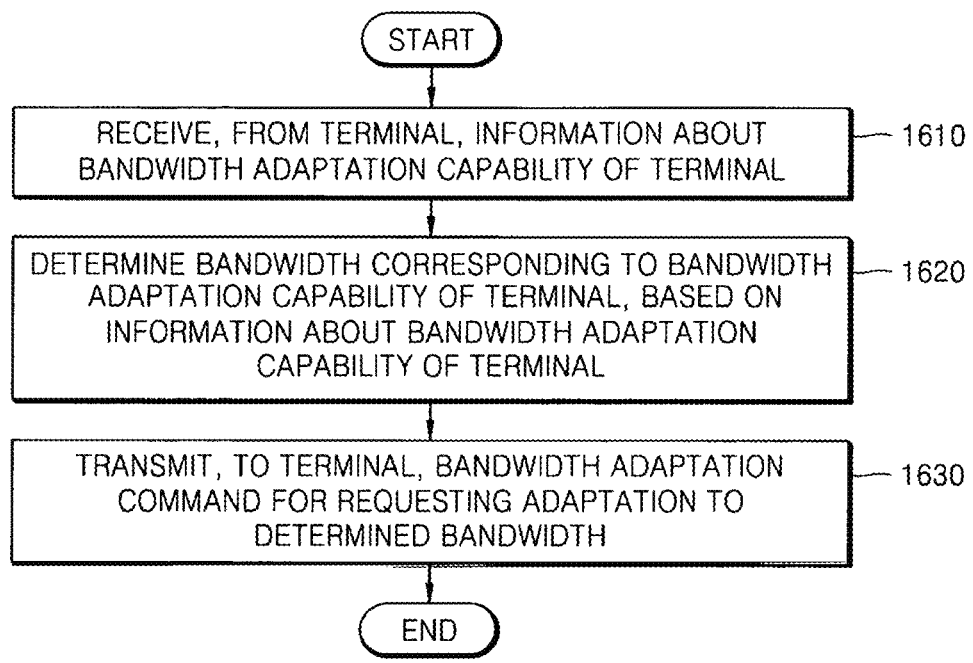
FIG. 16 is a flowchart of a method, performed by a base station (BS), of adapting a bandwidth of a terminal, according to an embodiment of the disclosure.

FIG. 16 is a flowchart of a method, performed by a BS, of adapting a bandwidth of a terminal, according to an embodiment of the disclosure.

Referring to FIG. 16, in operation 1610, the BS receives information about bandwidth adaptation capability of the terminal. For example, the BS may receive the information about the bandwidth adaptation capability of the terminal through terminal capability signaling.

In operation 1620, the BS determines a bandwidth corresponding to the bandwidth adaptation capability of the terminal, based on the information about the bandwidth adaptation capability of the terminal. The BS may determine a BWP to be activated, among at least one BWP adaptable by the terminal within overall system bands.

In operation 1630, the BS transmits, to the terminal, a bandwidth adaptation command for requesting adaptation to the determined bandwidth. Herein, the bandwidth adaptation command may include information about the determined bandwidth. The BS may transmit slot format control information to the terminal together with the information about the determined bandwidth.

Figure 17:
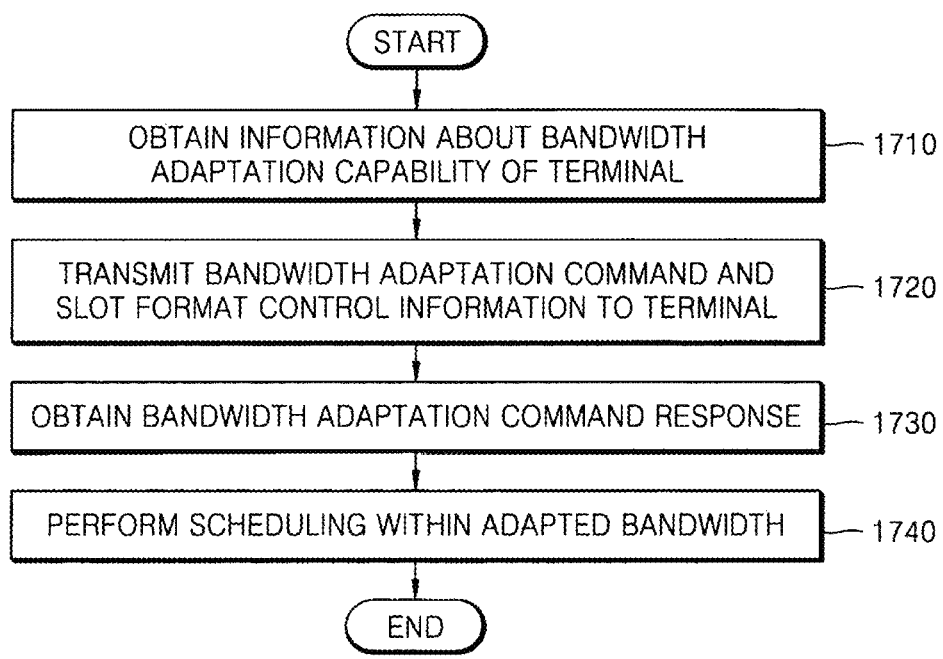
FIG. 17 is a flowchart of a method, performed by a BS, of adapting a bandwidth of a terminal, according to an embodiment of the disclosure.

FIG. 17 is a flowchart of a method, performed by a BS, of adapting a bandwidth of a terminal, according to an embodiment of the disclosure.

Referring to FIG. 17, in operation 1710, the BS may obtain information about bandwidth adaptation capability of the terminal. For example, the BS may receive the information about the bandwidth adaptation capability of the terminal through terminal capability signaling. According to another example, when information about bandwidth adaptation capability of at least one terminal is pre-stored, the BS may obtain the information about the bandwidth adaptation capability of the terminal based on the pre-stored information about the bandwidth adaptation capability.

In operation 1720, the BS may transmit a bandwidth adaptation command and slot format control information to the terminal. However, transmission of the bandwidth adaptation command and the slot format control information is merely an example, and the BS may transmit only the bandwidth adaptation command to the terminal as described above in relation to FIG. 16.

In operation 1730, the BS may obtain a bandwidth adaptation command response from the terminal. As the terminal receives the bandwidth adaptation command, the BS may receive the bandwidth adaptation command response from the terminal.

In operation 1740, the BS may perform scheduling within the adapted bandwidth. In addition, the BS may transmit and receive signals to and from the terminal within the adapted bandwidth based on scheduling.

Figure 18:
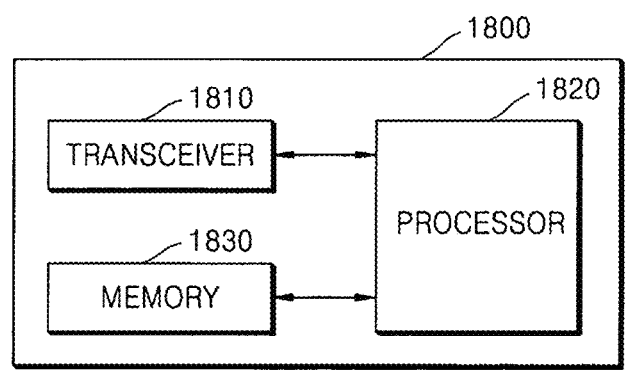
FIG. 18 is a block diagram of a terminal according to an embodiment of the disclosure.

FIG. 18 is a block diagram of a terminal 1800 according to an embodiment of the disclosure.

Referring to FIG. 18, the terminal 1800 may include a transceiver 1810, a processor 1820, and a memory 1830. The transceiver 1810, the processor 1820, and the memory 1830 of the terminal 1800 may operate based on the bandwidth adaptation methods of a terminal, which are described above in the previous embodiments. However, components of the terminal 1800 according to an embodiment are not limited to the above-mentioned components. According to another embodiment, the terminal 1800 may include a larger or smaller number of components compared to the above-mentioned components. In some cases, the transceiver 1810, the processor 1820, and the memory 1830 may be configured as a single chip.

The transceiver 1810 may transmit and receive signals to and from a BS. Herein, a signal may include control information and data. To this end, the transceiver 1810 may include an RF transmitter configured to up-convert and amplify a frequency of a transmitted signal, an RF receiver configured to low-noise-amplify a received signal and to down-convert a frequency of the received signal, etc. However, the RF transmitter and the RF receiver are merely examples, and the components of the transceiver 1810 are not limited thereto.

The transceiver 1810 may receive a signal through a radio channel and output the signal to the processor 1820, and transmit a signal output from the processor 1820 through the radio channel.

The processor 1820 may control a series of procedures to operate the terminal 1800 according to the afore-described embodiments. For example, when at least one bandwidth adaptation command is received from the BS through the transceiver 1810, the processor 1820 may perform the bandwidth adaptation methods according to the afore-described embodiments. Then, the transceiver 1810 may transmit signals through the adapted band.

The memory 1830 may store the control information or data included in the signals obtained by the terminal 1800, and have an area for storing data required for or generated due to control operation of the processor 1820. The memory 1830 may be configured in various forms, e.g., read-only memory (ROM) or/and random access memory (RAM) or/and a hard disk or/and compact disc-ROM (CD-ROM) or/and a digital versatile disc (DVD).

Figure 19:
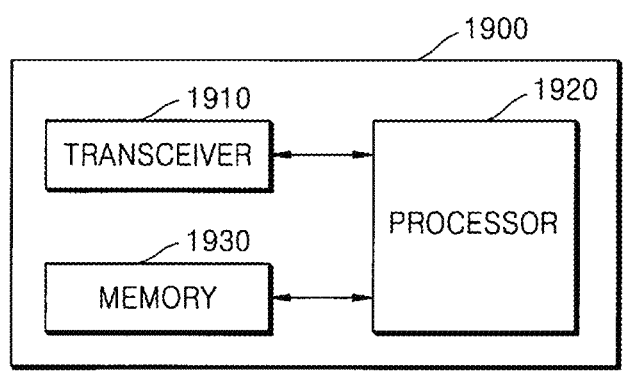
FIG. 19 is a block diagram of a BS according to an embodiment of the disclosure.

FIG. 19 is a block diagram of a BS 1900 according to an embodiment of the disclosure.

Referring to FIG. 19, the BS 1900 may include a transceiver 1910, a processor 1920, and a memory 1930. The transceiver 1910, the processor 1920, and the memory 1930 may operate based on the bandwidth adaptation methods of a BS, which are described above in the previous embodiments. However, components of the BS 1900 according to an embodiment are not limited to the above-mentioned components. According to another embodiment, the BS 1900 may include a larger or smaller number of components compared to the above-mentioned components. In some cases, the transceiver 1910, the processor 1920, and the memory 1930 may be configured as a single chip.

The transceiver 1910 may transmit and receive signals to and from a terminal. Herein, a signal may include control information and data. To this end, the transceiver 1910 may include an RF transmitter configured to up-convert and amplify a frequency of a transmitted signal, an RF receiver configured to low-noise-amplify a received signal and to down-convert a frequency of the received signal, etc. However, the RF transmitter and the RF receiver are merely examples, and the components of the transceiver 1910 are not limited thereto.

The transceiver 1910 may receive a signal through a radio channel and output the signal to the processor 1920, and transmit a signal output from the processor 1920 through the radio channel.

The processor 1920 may control a series of procedures to operate the BS 1900 according to the afore-described embodiments of the disclosure. For example, the processor 1920 may perform at least one of the bandwidth adaptation methods according to the afore-described embodiments. Then, the transceiver 1910 may transmit signals to the terminal through the adapted band.

The memory 1930 may store the control information or data included in the signals obtained by the BS 1900, and have an area for storing data required for or generated due to control operation of the processor 1920. The memory 1930 may be configured in various forms, e.g., ROM or/and RAM or/and a hard disk or/and CD-ROM or/and a DVD.

According to embodiments of the disclosure, bandwidth adaptation may be performed to efficiently utilize resources used to transmit and receive signals, by setting at least one BWP of overall system bands for each of terminals in a wireless communication system in consideration of different capabilities of the terminals.

It should be understood that embodiments described herein should be considered in a descriptive sense only and not for purposes of limitation. It will be understood by one of ordinary skill in the art that various changes in form and details may be made in the embodiments without departing from the scope of the disclosure. The embodiments are divided for convenience of explanation, and may be combined as necessary. For example, parts of Embodiments 1 to 4 may be combined to operate a BS and a terminal.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a terminal, of adapting a bandwidth of the terminal for transmitting and receiving signals, the method comprising:

transmitting, to a base station (BS), information about bandwidth adaptation capability of the terminal;

receiving, from the BS, a bandwidth adaptation command for requesting adaptation of the bandwidth of the terminal to a bandwidth corresponding to the bandwidth adaptation capability of the terminal and slot format information;

identifying bandwidth adaptation time on a unit time period of a subframe based on the bandwidth adaptation command and the slot format information; and adapting the bandwidth of the terminal in the identified bandwidth adaptation time.

2. The method of claim 1, wherein the adapting of the bandwidth of the terminal comprises:

determining a reception power value of a signal received by the terminal from the BS based on a reference signal (RS) received at at least one symbol location; and determining a dynamic range of an analog-to-digital converter (ADC) of the terminal based on the reception power value.

3. The method of claim 1, wherein the adapting of the bandwidth of the terminal comprises changing a first frequency band, which is preset to transmit and receive signals between the terminal and the BS, to a second frequency band based on the bandwidth adaptation command.

4. The method of claim 1, wherein at least one symbol location is comprised in the unit time period before a bandwidth of a signal transmitted from the BS is transitioned to a determined bandwidth.

5. The method of claim 1, wherein at least one symbol location is comprised in a unit time period in which a bandwidth of a signal transmitted from the BS is changed to a determined bandwidth.

6. The method of claim 1, further comprising transmitting, to the BS, a bandwidth adaptation command response indicating that the bandwidth adaptation command is received.

7. A method, performed by a base station (BS), of adapting a bandwidth of a terminal for transmitting and receiving signals to and from the terminal, the method comprising:
receiving information about bandwidth adaptation capability of the terminal;
determining a bandwidth corresponding to the bandwidth adaptation capability of the terminal based on the information about the bandwidth adaptation capability of the terminal; and
transmitting, to the terminal, a bandwidth adaptation command for requesting adaptation to the determined bandwidth and slot format information,
wherein bandwidth adaptation time on a unit time period of a subframe is identified based on the bandwidth adaptation command and the slot format information at the terminal, and
an adaptation of the bandwidth is performed in the identified bandwidth adaptation time.

8. The method of claim 7, further comprising:
transmitting a reference signal (RS) to the terminal through the determined bandwidth in at least one symbol location in a unit time period of a subframe,
wherein a dynamic range of an analog-to-digital converter (ADC) of the terminal is determined based on a reception power value of the RS.

9. The method of claim 7, further comprising:
receiving, from the terminal, a bandwidth adaptation command response indicating that the bandwidth adaptation command is received.

10. A terminal for adapting a bandwidth for transmitting and receiving signals, the terminal comprising:
a transceiver; and
at least one processor coupled with the transceiver and configured to:
control the transceiver to transmit, to a base station (BS), information about bandwidth adaptation capability of the terminal, and to receive, from the BS, a bandwidth adaptation command for requesting adaptation of the bandwidth of the terminal to a bandwidth corresponding to the bandwidth adaptation capability of the terminal and slot format information,
identify bandwidth adaptation time on a unit time period of a subframe based on the bandwidth adaptation command and the slot format information, and
adapt the bandwidth of the terminal in the identified bandwidth adaptation time.

11. The terminal of claim 10, wherein the at least one processor is further configured to:
determine a reception power value of a signal received by the terminal from the BS based on a reference signal (RS) received at at least one symbol location, and
determine a dynamic range of an analog-to-digital converter (ADC) of the terminal based on the reception power value.

12. The terminal of claim 10, wherein the at least one processor is further configured to change a first frequency band, which is preset to transmit and receive signals between the terminal and the BS, to a second frequency band based on the bandwidth adaptation command.

13. The terminal of claim 10, wherein at least one symbol location is comprised in the unit time period before a bandwidth of a signal transmitted from the BS is changed to a determined bandwidth.

14. The terminal of claim 10, wherein at least one symbol location is comprised in a unit time period in which a bandwidth of a signal transmitted from the BS is changed to a determined bandwidth.

15. The terminal of claim 10, wherein the at least one processor is further configured to control the transceiver to transmit, to the BS, a bandwidth adaptation command response indicating that the bandwidth adaptation command is received.

16. A base station (BS) for adapting a bandwidth of a terminal for transmitting and receiving signals to and from the terminal, the BS comprising:
a transceiver; and
at least one processor coupled with the transceiver and configured to:
control the transceiver to receive information about a bandwidth adaptation capability of the terminal,
determine a bandwidth corresponding to the bandwidth adaptation capability of the terminal based on the information about the bandwidth adaptation capability of the terminal, and
control the transceiver to transmit, to the terminal, a bandwidth adaptation command for requesting adaptation to the determined bandwidth and slot format information,
wherein bandwidth adaptation time on a unit time period of a subframe is identified based on the bandwidth adaptation command and the slot format information at the terminal and
an adaptation of the bandwidth is performed in the identified bandwidth adaptation time.

17. The BS of claim 16,
wherein the at least one processor is further configured to control the transceiver to transmit a reference signal (RS) to the terminal through the determined bandwidth in at least one symbol location in a unit time period of a subframe, and
wherein a dynamic range of an analog-to-digital converter (ADC) of the terminal is determined based on a reception power value of the RS.

18. The BS of claim 16, wherein the at least one processor is further configured to control the transceiver to receive, from the terminal, a bandwidth adaptation command response indicating that the bandwidth adaptation command is received.

19. A non-transitory computer-readable recording medium having recorded thereon a computer program for executing the method of claim 1.

* * * * *